United States Patent [19]

Kitagishi

[11] Patent Number: 5,140,462
[45] Date of Patent: Aug. 18, 1992

[54] OPTICAL SYSTEM HAVING IMAGE DEFLECTING FUNCTION

[75] Inventor: Nozomu Kitagishi, Tokyo, Japan

[73] Assignee: Canon Kabushiki Kaisha, Tokyo, Japan

[21] Appl. No.: 701,326

[22] Filed: May 7, 1991

Related U.S. Application Data

[63] Continuation of Ser. No. 291,263, Dec. 28, 1988, abandoned.

[30] Foreign Application Priority Data

Dec. 29, 1987 [JP] Japan .................. 62-335219
Dec. 22, 1988 [JP] Japan .................. 63-325557

[51] Int. Cl.⁵ .................. G02B 27/64; G02B 5/06
[52] U.S. Cl. .................. 359/554; 359/557; 359/832
[58] Field of Search .................. 350/500, 447, 286

[56] References Cited

U.S. PATENT DOCUMENTS 3,514,192 5/1970 Cierva .
3,941,451 3/1976 Humphrey .................. 350/500
4,467,188 8/1984 Suzuki et al. .
4,500,188 2/1985 Kitagishi et al. .
4,547,663 10/1985 Kitagishi et al. .
4,586,786 5/1986 Suzuki et al. .
4,650,988 3/1987 Suzuki et al. .
4,776,679 10/1988 Kitagishi et al. .
4,781,446 11/1988 Tanaka et al. .
4,810,070 3/1989 Suda et al. .

FOREIGN PATENT DOCUMENTS 56-40805 4/1981 Japan .
61-223819 10/1986 Japan .................. 350/500
384225 1/1965 Switzerland .................. 350/500

*Primary Examiner*—Jon W. Henry

[57] ABSTRACT

An optical device includes, from front to rear, a first lens unit arranged to produce an over-corrected lateral chromatic aberration and/or distortion, a variable vertical angle prism unit, and a second lens unit arranged to produce an under-corrected lateral chromatic aberration and/or distortion, wherein the aberrations produced when varying the vertical angle of the prism unit to stabilize an image are corrected well.

8 Claims, 23 Drawing Sheets

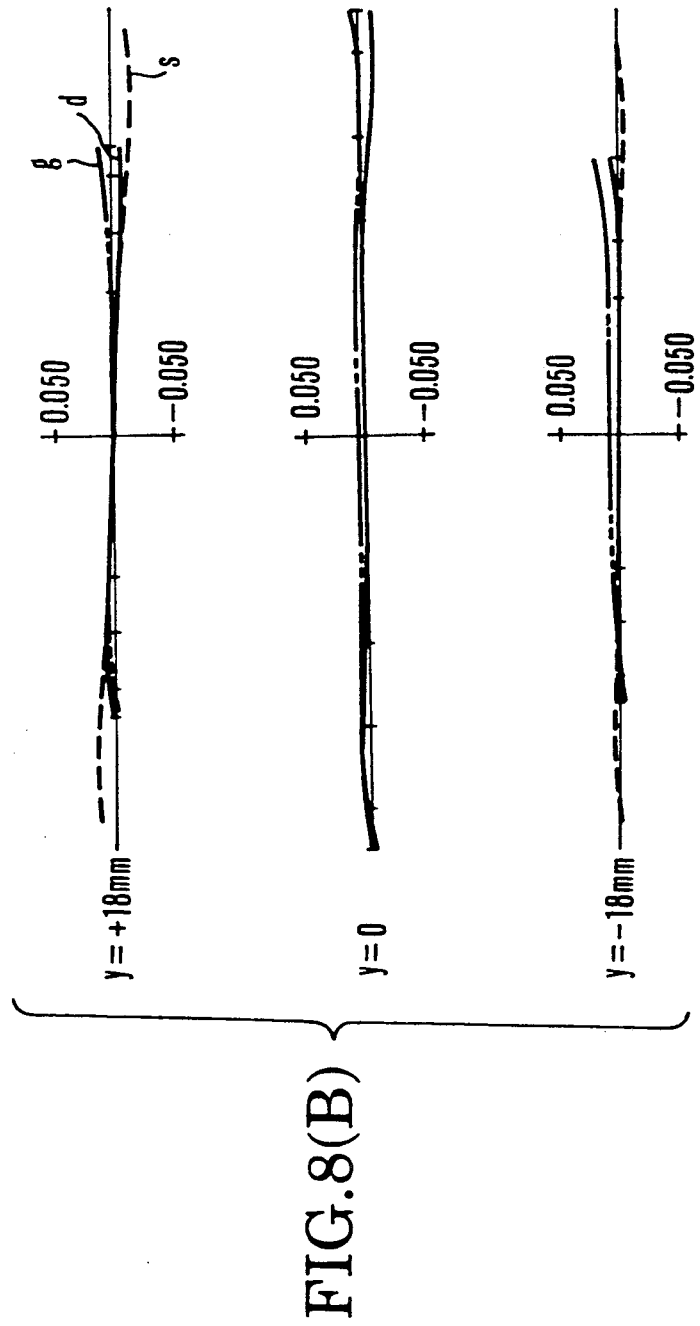

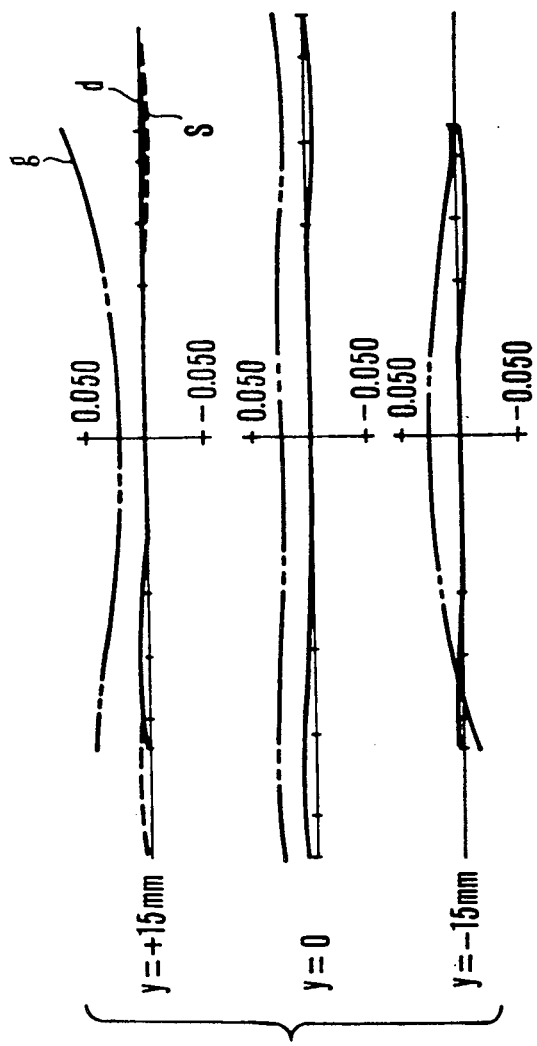

OPTICAL SYSTEM HAVING IMAGE DEFLECTING FUNCTION

This application is a continuation of application Ser. No. 07/291,263 filed Dec. 28, 1988 now abandoned.

BACKGROUND OF THE INVENTION

1. Field of the Invention

This invention relates to photographic system having image deflecting means and, more particularly, to a photographic system having image deflecting means in which by using a variable vertical angle prism provided in a lens system, an image blur caused by camera shake, etc. is compensated for to stabilize a photographic image, and which is suited for cameras for photography or video cameras.

2. Description of the Related Art

When shooting from a running car, etc., a shake propagates into the photographic system. This leads to blur an image to be formed. There have been many proposals for a photographic system having image deflecting means in the form of a parallel flat plate or a variable vertical angle prism arranged in the optical system to compensate for that blur of the image.

For example, Japanese Patent Publication No. Sho 56-21133 discloses a photographic system utilizing the variable vertical angle prism to compensate for the image blur. In the Publication, a space between two flat glass plates is filled with liquid or transparent elastic material in seal and the angle of intersection of these glass plates is made to vary for the purpose of compensating for the blur of the image.

Furthermore, that Publication proposes another photographic system in which a plano-convex lens and a plano-concave lens are mated at their spherical surfaces in slidable relation to make variable the angle of intersection of their plane surfaces.

In general, with the variable vertical angle prism for compensating for the image blur arranged in front, or in the interior, of the lens system, when the vertical angle of that prism increases to a considerably large value, a decentering lateral chromatic aberration due to the chromatic dispersion of the prism is produced in the deflected image.

This function is illustrated in FIGS. 14(A) and 14(B). P is a variable vertical angle prism. When the vertical angle is varied as shown in FIG. 14(A), the spectral g-line is caused to deflect greater than the d-line. The use of such a variable vertical angle prism P in combination with the master lens M as shown in FIG. 14(B) for the purpose of deflecting the image, therefore, leads to produce a decentering lateral chromatic aberration $\Delta(\Delta Y)$.

This decentering lateral chromatic aberration occurs almost by the same magnitude and in one and the same direction over the entire area of the image plane from its center to its margin, thus becoming a cause of lowering the contrast and of producing stain of colors. Since the decentering lateral chromatic aberration differs from the ordinary lateral chromatic aberration in that it appears even in such a central portion of the image plane that the image of the object of principal photographic interest often occupies, it is a serious cause of lowering image quality.

To overcome this problem, U.S. Pat. No. 3,514,192 and Japanese Patent Publication No. Sho 57-7416 propose the use of two variable vertical angle prisms of different dispersion arranged to be driven with maintenance of a constant angle ratio so as to satisfy the achromatic condition, thus providing photographic systems capable of reducing a decentering lateral chromatic aberration.

However, this method, because of the necessity of the two variable vertical angle prisms, tends to increase the axial thickness of a deflecting element and has another tendency that the structure of a mechanism for driving the two prisms while maintaining constant the angle ratio becomes relatively complicated.

Also, Japanese Laid-Open Patent Application No. Sho 61-223819 proposes the use of one variable vertical angle prism in combination with a cemented lens whose refractive power is equal to almost zero and which is arranged behind the photographic system. By driving the cemented lens to decenter in a direction perpendicular to the optical axis in synchronism with a motion of the variable vertical angle prism, despite the use of the variable vertical angle prism type, the decentering lateral chromatic aberration is corrected.

In addition, in Japanese Patent Publication Sho 56-40805, by utilizing the rotative slide type of the plano-convex and plano-concave lenses, a prism is formed to have a substantially variable vertical angle. Thus, the accidental displacement of the photographic system, or the blur of the image, is compensated for.

Meanwhile, in the image stabilizing optical system of the type using the function of the variable vertical angle prism, not only the decentering lateral chromatic aberration, but also a decentering distortion come to produce as well.

FIGS. 17(A), 17(B) and FIG. 18 are diagrams illustrating the state of production of a decentering distortion caused by the variable vertical angle prism.

FIG. 17(A) is the initial state where the two surfaces of the variable vertical angle prism are parallel to each other, rays of light o, a and b being principal rays of light beams which are to focus at an image plane center o', off-axial points a' and b', respectively.

FIG. 17(B) and FIG. 18 show a state of the principal rays o, a and b when the variable vertical angle prism has a vertical angle A. As the second surface of the variable vertical angle prism inclines by an angle A°, a ray of light coming from an object enters the first surface of the variable vertical angle prism having the vertical angle A at an angle of incidence $\theta$. It is then refracted by the first and second surfaces and exits from the variable vertical angle prism at an angle $\theta p$ with the optical axis according to the following formulae:

$\theta_1 = \sin^{-1}(\sin\theta/Np)$ $\theta_2 = \theta_1 + A$ $\theta_2' = \sin^{-1}(Np \cdot \sin\theta_2)$ $\theta p = \theta_2' - A$ where $\theta_1$ is the angle of refraction at the first surface of the variable vertical angle prism, $\theta_2$ is the angle of incidence on the second surface, $\theta_2'$ is its angle of emergence, $\theta p$ is the angle that the exiting ray makes with the optical axis, and $Np$ is the refractive index of the medium of the prism. The principal ray having the angle $\theta p$ with respect to the optical axis, when produced, arrives on an image plane at a height y' expressed by the formula: $y' = f \cdot \tan\theta p$.

Therefore, if the angles of deflection $\delta(\delta = \theta p - \theta)$ of the principal rays at the second surface are the same, the image, while keeping the original shape, is deflected on the image plane. In fact, however, as their angles of incidence on the variable vertical angle prism differ from one another, the principal rays are deflected at different angles. Hence, all the points o', a' and b' on the image plane behave in different ways from one another as shown in FIG. 17(B). This can be evaluated quantitatively in terms of a ratio of a minute angle dA by which the vertical angle of the variable vertical angle prism changes from the initial state to the resultant change $d\theta p$ of the angle of emergence of a ray with respect to the optical axis, i.e., the sensitivity, as a function of the angle of incidence $\theta$ on the variable vertical angle prism as follows:

$$d\theta p/dA = (\sqrt{Np^2 - (\sin\theta)^2})/\cos\theta - 1$$

This equation represents that the larger the absolute value of the angle of incidence $\theta$, the larger the positive value of the sensitivity $d\theta p/dA$ becomes.

In the case of the on-axial ray o, because its angle of incidence on the prism surface is small, the angle of deflection $\delta(\delta = \theta p - \theta)$ resulting from the change of the vertical angle, i.e., the angle of incidence on the second surface of the prism, to the value A is in proportional relation to the vertical angle A, that is, represented by $$\delta \simeq (Np - 1)A$$

In a case where the angle of incidence on the second surface is relatively large like the off-axial ray a, on the other hand, even if the vertical angle is similarly changed to the value A, the absolute value of the angle of deflection becomes larger than that found by the above-cited equation: $\delta = (Np - 1)A$.

For example, the off-axial ray a, when the vertical angle has changed in the direction shown in FIG. 18 to the value A, has its angle of incidence $\theta_2$ on the second surface of the variable vertical angle prism change in a direction to be larger than when in the initial state, so that the angle $\theta p$ that the exiting ray makes with the optical axis gets larger than $\theta + \delta$. On the image plane, therefore, a distortion in an "over" direction appears as shown by an arrow $a_A'$ in FIG. 17(B).

Another off-axial ray b, when the vertical angle has become the value A, has its angle of incidence $\theta_2$ on the second surface of the variable vertical angle prism change in a direction to take a smaller absolute value than that when in the initial state, so that the angle $\theta p$ that the exiting ray makes with the optical axis gets smaller in the absolute value than $\theta + \delta$. On the image plane, therefore, the distortion is formed also in an "over" direction as shown by an arrow $b_A'$ in FIG. 17(B).

When such decentering distortion is present, an object to be photographed as shown in FIG. 19(A) is imaged in a distorted form as shown by solid lines in FIG. 19(B), where dashed lines represent an ideal image in the case of lack of the decentering distortion.

Accordingly, in the vibration proof optical system using the variable vertical angle prism for compensating for the image blur resulting from camera-shake by deflecting the image in the reverse direction, as has been described above, if the decentering distortion is present, the amount of movement of the image at the central point in the image plane differs from those at the marginal points. Even though the compensation for the image blur is perfect in the center of the image frame, it is in the marginal zone that the image would diffuse. FIG. 19(C) is a result of compensation for the blur of the image of the object of FIG. 19(A) by the vibration-proof optical system having the decentering distortion.

SUMMARY OF THE INVENTION

A first object of the invention is to provide an optical system using a variable vertical angle prism for deflecting the image.

A second object is that this optical system is well corrected for decentering aberrations, particularly a decentering lateral chromatic aberration or a decentering distortion, as produced when the vertical angle of the prism varies.

BRIEF DESCRIPTION OF THE DRAWINGS

FIGS. 5(A), 5(B), FIGS. 6(A), 6(B), FIGS. 7(A), 7(B) and FIGS. 8(A), 8(B), are graphic representations of the aberrations of the numerical examples 1, 2, 3 and 4 of the invention, respectively.

FIGS. 16(A) and 16(B) are aberration curves due to the conventional method.

DETAILED DESCRIPTION OF THE PREFERRED EMBODIMENTS

FIG. 1, FIG. 2, FIG. 3 and FIG. 4 in block diagram show the numerical examples 1, 2, 3 and 4 of an embodiment of the invention. In these figures, I is a fixed first lens unit, P is a variable vertical angle prism constituting part of image deflecting means, II is a fixed second lens unit.

In this embodiment, by varying the vertical angle of the variable vertical angle prism P, the blur of a photographic image is compensated for. Of these examples, the ones shown in FIG. 1, FIG. 2 and FIG. 4 use a transparent silicon rubber as a medium between two glass plates in a sealed form to produce the variable vertical angle prism. Its vertical angle is varied as the prism is driven by an actuator 2 after the amount of the image blur has been detected by an acceleration detector 1.

In this embodiment, rays of light emerging from the first lens unit I are made almost afocal. When the on-axial beam incident on the variable vertical angle prism P is nearly afocal, in other words, when the angle of inclination $\alpha$ of the paraxial rays of the on-axial beam is nearly so small as to satisfy a condition: $|\alpha| < 0.3 < f_T$ where $f_T$ is the focal length of the entire system, as compared with a case where it is not afocal, the decentering coma, decentering astigmatism and decentering curvature of field produced in the variable vertical angle prism are small. Hence, the correction of the spherical aberration, coma and astigmatism of a partial system of the second lens unit II to a minimum leads, in principle, to a possibility of minimizing the decentering coma, decentering astigmatism and decentering curvature of field produced, and, therefore, of lessening the number of constituent lens elements for the second lens unit II.

Also, the construction of the variable vertical angle prism in the form of the two glass plates with the transparent silicon rubber sealed therebetween has a merit that a thin thickness of the variable vertical angle prism can be achieved.

Figure 3:
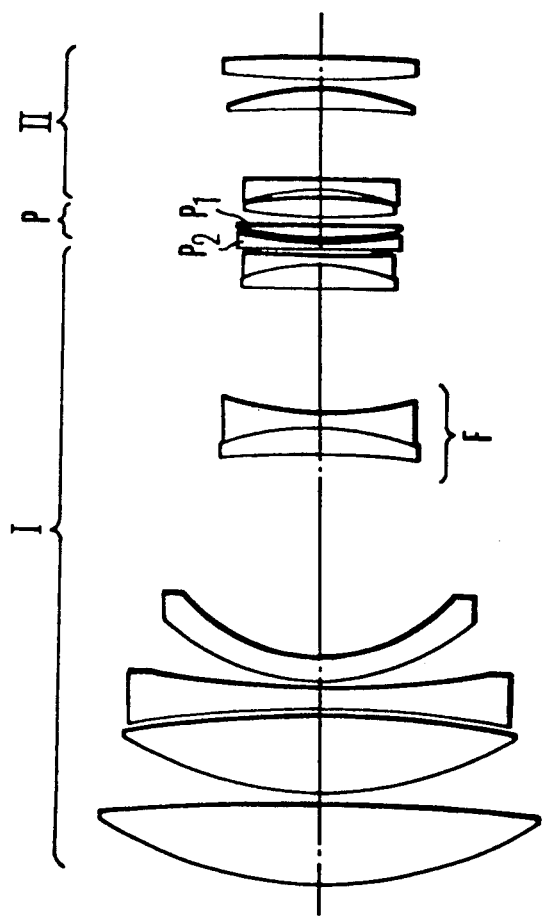

In the example shown in FIG. 3, the variable vertical angle prism P is formed by a plano-convex lens $P_1$ and a plano-concave lens $P_2$ of which the confronting surfaces have the same radius of curvature. By moving the confronting lens surfaces slidingly to each other, the angle that the flat surfaces make is made variable, thus causing the vertical angle to substantially vary.

In such a system, for the construction of the first lens unit I and the second lens unit II and the arrangement of the variable vertical angle prism P, the invention sets forth the above-described features to achieve compensation for the blur of a photographic image in such a manner that the optical quality of the entire area of the image plane is maintained excellent.

Figure 9:
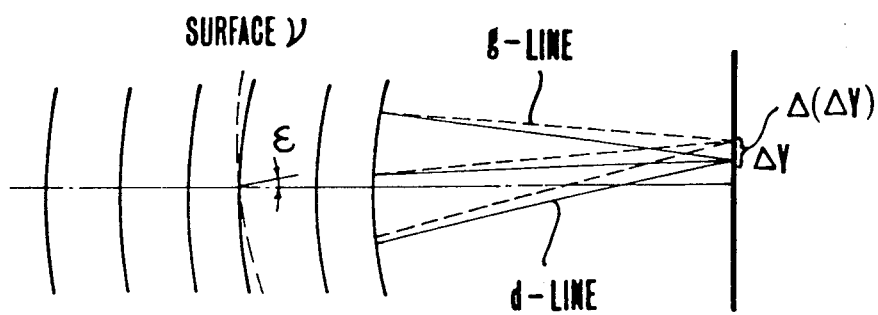
FIG. 9 is a diagram to explain the decentering aberration coefficients in the invention.
Figure 10:
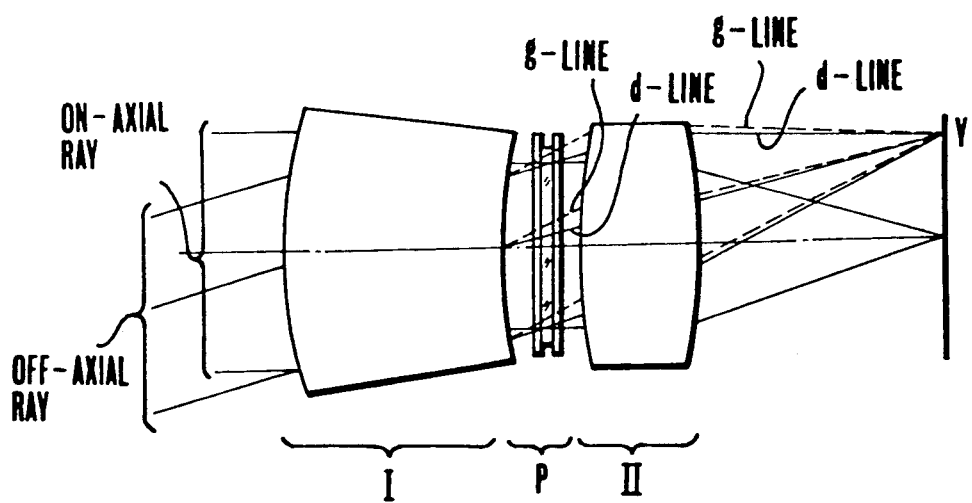
FIG. 10 and FIG. 11 are diagrams each to explain the principle of correcting the lateral chromatic aberration in the invention.
Figure 11:
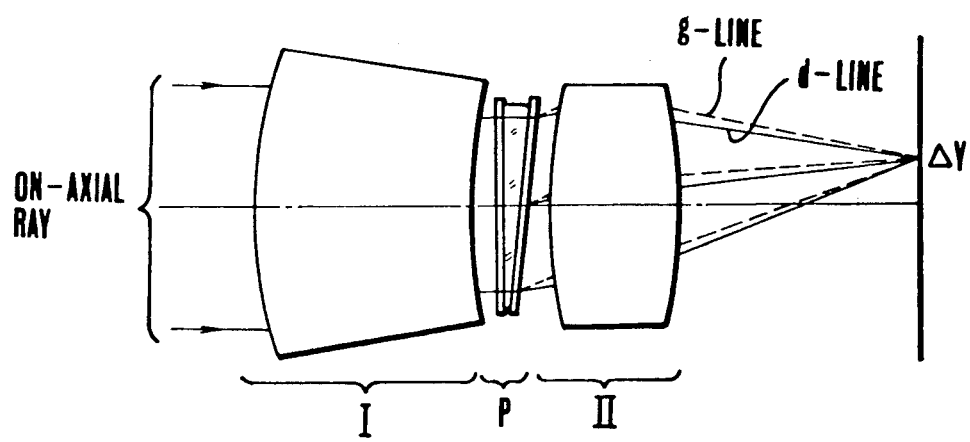

FIG. 9 is a diagram to explain decentering aberration coefficients when arbitrary one lens surface $\nu$ in the lens system tilts an angle $\epsilon$, FIG. 10 is an explanation diagram in a case where a photographic system according to the invention has its variable vertical angle prism P not varied in the vertical angle, and FIG. 11 is an explanation diagram in another case where the vertical angle of the variable vertical angle prism P has changed.

Of these, FIG. 10 shows the optical paths of an on-axial light beam and an off-axial light beam in two wavelengths, namely, the d-line as the standard wavelength and the g-line as the second wavelength. Also, FIG. 11 shows the deflection by $\Delta Y$ of the optical path in the two wavelengths, namely, the d-line and g-line when the vertical angle of the variable vertical angle prism P has changed an angle $\epsilon$.

At first, on the decentering aberrations in this embodiment, explanation is made by using FIG. 9. As shown in FIG. 9, when the $\nu$-th lens surface in the lens system has tilted an angle of $\epsilon_\nu$, decentering aberrations are produced as discussed in "the Lens Design Seminar" in the year of 1975 at Chapter 7 by Ozeki: Third-Order Decentering Aberration and Determination of Tolerances. According to this, the decentering lateral chromatic aberration $\Delta(\Delta Y)$ is given by the expression:

$$\Delta(\Delta Y) = -\cos \phi_\nu \overline{T}_\nu \epsilon_\nu f_T / \alpha_K'$$

$$\overline{T}_\nu = h_\nu(N_\nu' - N_\nu)$$
$$(\Sigma_\nu{}^K + _T1 - (h/\overline{h})_\nu \Sigma_\nu{}^K + _1L) - N_\nu L_\nu/(h \cdot Q)_\nu$$

Here, the aberration coefficient and the paraxial quantity are evaluated based on the focal length of the entire system when normalized to unity, $f_T$ represents the focal length of the entire system, and $\overline{T}_\nu$ is the decentering lateral chromatic aberration coefficient at the time when the $\nu$-th lens surface has tilted.

Next, this equation is applied to the variable vertical angle prism, transformed and rearranged. Designating the prism surface by s subscript P and the fixed lens unit that is arranged behind the variable vertical angle prism, i.e., the second lens unit, by a subscript 2, $$\Delta(\Delta Y) = -\cos \phi_P \epsilon_P f_T \{(N_P - 1)$$
$$(\overline{h}_P L_2 - h_P T_2) + h_P(\delta N_P)\}/\alpha_K'$$

is obtained. Here, NP is the refractive index for the standard wavelength, for example, d-line, of the variable vertical angle prism, and $\delta N_P$ is the difference between the refractive index $N_P$ for the standard wavelength d-line and the refractive index $N_2$ for the second wavelength, for example, g-line, of the variable vertical angle prism, i.e., $|N_P - N_2|$. In order that the decentering lateral chromatic aberration does not generate, $\Delta(\Delta Y) \approx 0$ is necessary. Hence, it is required that the coefficients $L_2$ and $T_2$ of the second lens unit do satisfy the following condition:

$$(N_P - 1)(\overline{h}_P L_2 - h_P T_2)(\delta N_P) \approx 0$$

In this equation, the longitudinal and lateral chromatic aberrations of the second lens unit appear both to come in correlation. Yet, when the variable vertical angle prism is put into the lens as in the invention, it can often be regarded to lie adjacent to the diaphragm. For this case, the $\overline{h}_P$ has a small value. So, the lateral chromatic aberration $h_P$ of the second lens unit becomes dominant on correction of the decentering lateral chromatic aberration. In general case, therefore, the second lens unit may be corrected for chromatic aberrations in such a way as to satisfy the following condition:

$$T_2 \approx (\delta N_P)/(N_P - 1)$$

Since the right side of this equation has a positive value, if the lateral chromatic aberration of the second lens unit is largely under-corrected, the decentering lateral chromatic aberration produced can become minimum. Virtually, if the coefficient $T_2$ is, as has been described above, on such an order as to satisfy the condition:

$$-0.012 < T_2 - (\delta N_P)/(N_P - 1) < 0.012 \quad (1)$$

the decentering lateral chromatic aberration produced can be minimized so as to have no influence. When the lower limit of the inequalities of condition (1) is exceeded, an under-correction of the decentering lateral chromatic aberration results. When the upper limit is exceeded, the decentering lateral chromatic aberration is over-corrected, and the decentering lateral chromatic aberration is produced in the reverse direction to that when not corrected.

Further, to correct the lateral chromatic aberration of the initial state, it is good to satisfy the following condition:

$$-1.3 < T_1/T_2 < -0.7 \quad (2)$$

where $T_1$ is the lateral chromatic aberration coefficient of the first lens unit.

This means that the lateral chromatic aberration of the first lens unit is produced in the reverse direction to that of the second lens unit to make correction in good balance.

When the lower limit of the inequalities of condition (2) is violated, the lateral chromatic aberration in the initial state remains in an "over" direction. When the upper limit of the inequalities of condition (2) is violated, the lateral chromatic aberration in the initial state remains in an "under" direction. In either case, as the lateral chromatic aberration in the initial state is large, a satisfactory image quality cannot be obtained.

It should be noted that according to the "Lens Design Method" by Matsui ('81, Kyoritsu Publishing Co.), the lateral chromatic aberration coefficient Ti of each lens surface in the equation above in terms of the focal length of the entire system normalized to unity can be expressed by:

$$T_i = h_i \bar{h_i} \bar{Q} \Delta_i \left( \frac{\delta N}{N} \right)$$

where $$\Delta_i \left( \frac{\delta N}{N} \right) = \frac{\delta N_i}{N_i} - \frac{\delta N_{i-1}}{N_{i-1}}$$

so that the lateral chromatic aberration $\Delta(\Delta y)$ of the entire system can be expressed by:

$$\Delta(\Delta y) = -\frac{N_O \cdot f_T \cdot \tan\omega}{\alpha K} \sum_i^K T_i$$

Next, using FIG. 10 and FIG. 11, the lateral chromatic aberration coefficient with respect to the variable vertical angle prism is explained.

In the variable vertical angle prism which has got a vertical angle e, since the light ray of the g-line is refracted more greatly than that of the d-line, the lateral chromatic aberration $\Delta(\Delta Y)_P$ (this is even the decentering lateral chromatic aberration) due to the variable vertical angle prism, as given by the expression:

$$\Delta(\Delta Y)_P \propto \tan(\Delta\omega)\Delta\omega \approx -\epsilon \cdot (N_P - 1)$$

(where $N_P$ is the refractive index of the prism) is produced in an "over" direction in proportion to the angle of deflection of the variable vertical angle prism. Meanwhile, the lateral chromatic aberration is proportional to the angle of view. In the decentering state of the varied vertical angle, the angle of view for the light ray arriving at the second lens unit corresponds to the angle of deflection of the light ray in passing through the variable vertical angle prism. The second lens unit is made to produce lateral chromatic aberration for correcting purposes. From this standpoint, letting the lateral chromatic aberration coefficient of the second lens unit be denoted by $T_2$, the lateral chromatic aberration $\Delta(\Delta Y)_2$ that the second lens unit produces takes a value proportional to the angle of view as follows:

$$\Delta(\Delta Y)_2 \propto -T_2 \tan(\Delta 107)$$

In this embodiment, the lateral chromatic aberration coefficient $T_2$ of the second lens unit is chosen so as to have a positive value, in other words, the second lens unit is under-corrected for lateral chromatic aberration. By this, the lateral chromatic aberration produced from the variable vertical angle prism is canceled. It is, therefore, in the entire system that the decentering lateral chromatic aberration is corrected in good balance.

The principal ray of the off-axial beam, too, on the same side as the direction of deflection, has a larger angle of incidence on the second lens unit when in the decentered state than when in the initial state. Therefore, the under-corrected lateral chromatic aberration that the second lens unit produces gets larger. Accordingly, the over-corrected lateral chromatic aberration produced from the variable vertical angle prism is corrected.

Also, in this embodiment, the first lens unit is made to correct chromatic aberrations in such a manner that over-correction of lateral chromatic aberration results, while the second lens unit is made to correct chromatic aberrations in such a manner that great under-correction of lateral chromatic aberration results, so that as a whole the lateral chromatic aberrations are corrected in good balance.

In the photographic system having the variable vertical angle prism positioned between the two fixed lens units as in this embodiment, the deflection $\Delta Y$ of the image on the image plane by the variable vertical angle prism is formed by the deflection $\Delta Y_1$ of an image of the first lens unit by the variable vertical angle prism and, after that, by the second lens unit relaying it at a magnifying power $\beta_2$. That is, $$\begin{aligned} \Delta Y_1 &= S \cdot \tan\{(N_P - 1) \cdot \epsilon_P\} \\ \Delta Y &= (\Delta Y_1) \cdot \beta_2 \\ &= S \cdot \beta_2 \cdot \tan\{(N_P - 1) \cdot \epsilon_P\} \end{aligned}$$

wherein S is the distance from the variable vertical angle prism to the image plane of the first lens unit.

In the case of the second wavelength, the deflection $\Delta Y'$ of the image is $$\Delta Y' = S' \beta_2' \cdot \tan\{(N_P' - 1) \cdot \epsilon_P\}$$

Accordingly, the condition that the decentering lateral chromatic aberration, or $\Delta(\Delta Y) = \Delta Y' - \Delta Y$ becomes 0 is $$S' \beta_2'/(S \cdot \beta_2) =$$

$$\tan\{(N_P - 1) \cdot \epsilon_p\}/\tan\{(N_P' - 1) \cdot \epsilon_P\} \approx (N_P - 1)/(N_P' - 1)$$

When the chromatic aberrations of the first lens unit is small, $S' \approx S$. Therefore, it may be approximated as $$\beta_2'/\beta_2 \approx (N_P - 1)/(N_P' - 1)$$

It is to be understood from this that the image magnification for each wavelength of the second lens unit may be designed to be in reverse proportion to the $(N_P - 1)$ of each wavelength of the variable vertical angle prism.

In this embodiment, when the first lens unit is not afocal, i.e., the focal length $f_1$ of the first lens unit falls in a range: $|f_1| < 20f$ where f is the focal length of the entire system, the values of the image magnifications $\beta_2$ and $\beta_2'$ are determined so as to satisfy $$0.985 < \frac{(\beta_2') \cdot (N_P' - 1)}{(\beta_2) \cdot (N_P - 1)} < 1.015 \qquad (3)$$

Accordingly, the decentering lateral chromatic aberration produced is so much minimized as to have no influence.

When the upper limit of the inequalities of condition (3) is exceeded, under-correction of a decentering lateral chromatic aberration results. When the lower limit is exceeded, over-correction of a decentering lateral chromatic aberration results. It is no good because the decentering lateral chromatic aberration is produced in the reverse direction to that when not corrected.

In another case where a light beam emerging from the first lens unit is afocal, particularly when $|f_1| > 20f$, $$\Delta Y = f_2 \cdot \tan\{(N_P - 1) \cdot \epsilon_P\}$$

where $f_2$ is the focal length of the second lens unit, is obtained. Even for the second wavelength, similarly, $$\Delta Y' = f_2' \cdot \tan\{(N_P' - 1) \cdot \epsilon_P\}$$

is obtained. From these, the condition that the decentering lateral chromatic aberration $\Delta(\Delta Y) = \Delta Y' - \Delta Y$ becomes 0 is found as:

$$f_2'/f_2 = \tan\{(N_P - 1) \cdot \epsilon_P\}/\tan\{(N_P' - 1) \cdot \epsilon_P\} \approx (N_P - 1)/(N_P' - 1)$$

The focal length for each wavelength of the second lens unit may be set to be in reverse proportion to the $(N_P - 1)$ for that wavelength of the variable vertical angle prism. This, too, means that the second lens unit is caused to produce an under-corrected lateral chromatic aberration by which the decentering lateral chromatic aberration produced from the variable vertical angle prism is corrected.

In this embodiment, the focal length $f_2$ for the standard wavelength of the second lens unit and the focal length $f_2'$ for the second wavelength are set so as to satisfy the condition:

$$0.985 < \frac{f_2' \cdot (N_P' - 1)}{f_2 \cdot (N_P - 1)} < 1.015 \qquad (4)$$

Thus, the decentering lateral chromatic aberration produced is so much minimized as to have little influence.

When the upper limit of the inequalities (4) is exceeded, under-correction of a decentering lateral chromatic aberration results. When lower limit is exceeded, over-correction of a decentering lateral chromatic aberration results. It is no good because the decentering lateral chromatic aberration is produced in the reverse direction to that when not corrected.

It should be noted that, in this embodiment, if the photographic system is a photographic lens, it is good to take the d-line as the standard wavelength, and the g-line as the second wavelength. But, as the second wavelength a light of longer wavelength than the d-line may be chosen. To other optical instruments, it is good that for the standard wavelength, the principal wavelength in the given optical instrument is taken, and, for the second wavelength, a light of the usable shortest wavelength is chosen.

In this embodiment, though the first and second lens units are stationary against driving to decenter, these lens units may include axially movable lens units such as a focusing lens unit and variable magnification lens units.

It should be noted that in this embodiment, to further well correct the lateral chromatic aberration, it is good to produce lateral chromatic aberration in the second lens unit in an "under" direction. For this purpose, it is good to construct the second lens unit as follows:

That is, the second lens unit is divided by a largest intervening air separation in the unit into two parts, i.e., a second lens front unit and a second lens rear unit, wherein letting the refractive power of each lens constituting the second lens rear unit be denoted by $\phi 2Bi$, the Abbe number of the material by $\nu 2Bi$ and the equivalent Abbe number by V2B, and defining $$V2B = \Sigma(\phi 2Bi)/\{\Sigma(\phi 2Bi)/(\nu 2Bi)\}$$

the following condition is satisfied:

$$V2B < 40 \qquad (5)$$

When the equivalent Abbe number V2B becomes large beyond the inequality of condition (5), the refractive power of the second lens rear unit must be increased. As a result, large coma and astigmatism are produced. So it is no good.

The foregoing explanation is given mainly to the lateral chromatic aberration. In the following, explanation on the distortion will be made.

Figure 12A:
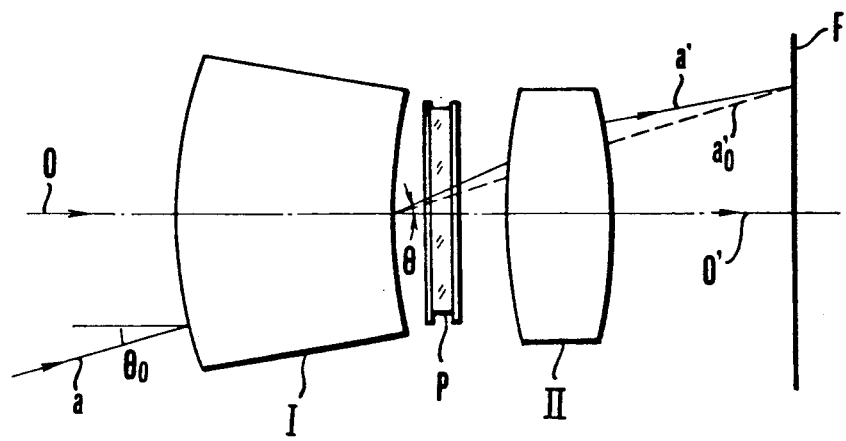
FIGS. 12(A) and 12(B) are diagrams to explain the principle of correcting the decentering distortion in the invention.
Figure 12B:
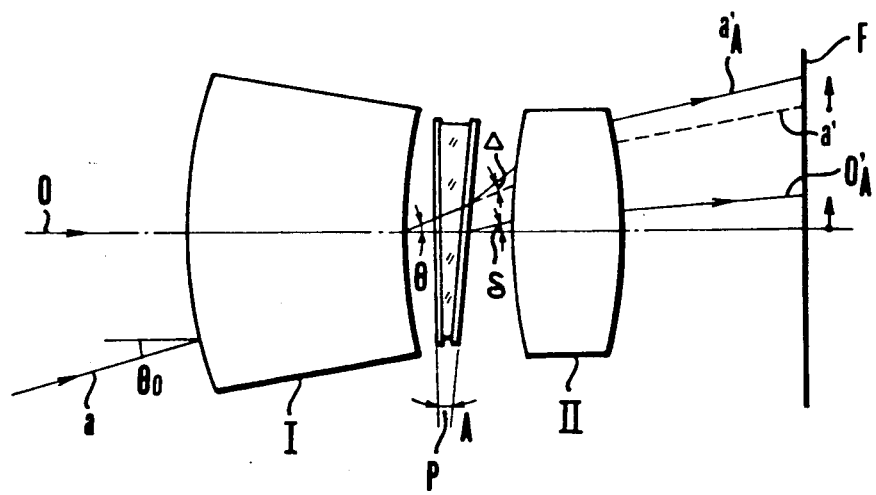

FIGS. 12(A) and 12(B) are diagrams schematically illustrating another optical system according to the invention. I is a first lens unit having a lateral chromatic aberration and a distortion produced in an "over" direction and arranged in front of the variable vertical angle prism P, and II is a second lens unit holding a lateral chromatic aberration and a distortion in an "under" direction and arranged behind the variable vertical angle prism P. F represents a film plane. "a" represents a principal ray of light at an angle of view $\theta_0$.

Even in the optical system that this embodiment shows, the first lens unit I and the second lens unit II each have a relatively large lateral chromatic aberration and distortion. But, particularly when the vertical angle of the prism P is not varied yet, or the prism P is in the initial state, the over-corrected chromatic aberration produced from the first lens unit is canceled by the under-corrected chromatic aberration that the second lens unit produces. As the whole photographic system (I, P, II), the aberration is well corrected as shown in FIG. 12(A).

Particularly in the initial state, the distortions that the first lens unit and the second lens unit produce, denoted by $Dis(\theta_0)_I$ and $Dis(\theta)_{II}$, respectively, are made to satisfy the following relationship:

$$Dis(\theta_0)_I \approx -Dis(\theta_0)_{II}$$

Now, on the premise that the two lens units I and II are corrected for aberrations in such a fashion, the vertical angle A is then varied to deflect the image for the purpose of performing vibration-proof treatment as shown in FIG. 12(B). A principal ray from exactly the same angle of view as that in the initial state, when in passing through the first lens unit I, produces, as a matter of course, exactly the same value of distortion as that in the initial state. And, the principal ray "a" emerging from the first lens unit I with an angle of inclination $\theta$ is deflected by $\Delta$ in passing through the variable vertical angle prism which has got the vertical angle A. As has been described before, it should be pointed out again that it is more greatly deflected than the amount of deflection $\delta \approx (N_P - 1)A$ of the paraxial ray. Thus, its amount of deflection gets excessive. Therefore, the principal ray emerging from the variable vertical angle prism is caused to enter the second lens unit II at a greater angle of inclination than in the initial state by the $\Delta$, i.e., $(\theta + \Delta)$. Since, at this time, the distortion for the angle of inclination $(\theta + \Delta)$ produced from the second lens unit II is greater in the "under" sense than that for the inclination angle $\theta$, the excess of the deflection of the principal ray deflected by the variable vertical angle prism (that is, it becomes the decentering distortion of the variable vertical angle prism) is corrected. Hence, on the image plane, the difference between its amount of deflection and the amount of deflection of the ray "o" entering along the optical axis can be corrected to a minimum. That is, the decentering distortion can be corrected to a minimum. The relationship of the distortions at this time can be given by the expression:

$$Dis(\theta_0)_I + Dis(\theta, A)_P \approx -Dis(\theta + \Delta)_{II}$$

where $Dis(\theta, A)_P$ represents the distortion produced from the variable vertical angle prism having a vertical angle A, $Dis(\theta + \Delta)_{II}$ represents the distortion of the ray of the inclination angle $(\theta + \Delta)$ produced from the second lens unit.

Here, the necessary condition that the inclination angle of the off-axial beam incident on the second lens unit increases with increase in distortion is given in terms of the third-order distortion coefficient $V_2$ of the second lens unit by the following expression:

$$V_2 > 0 \tag{6}$$

And, to well correct the distortion over the entire range of deflection of the image from the initial state, it is good to satisfy the following condition:

$$-1.3 < V_1/V_2 < -0.7 \tag{7}$$

where $V_1$ is the third-order distortion coefficient of the first lens unit.

When the upper limit of the inequalities of condition (7) is exceeded, the distortion of the first lens unit is somewhat excessively over-corrected. Also, in the entirety of- the photographic system, the distortion of "over" tendency remains either when in the initial state or when decentered. This is not preferable. Meanwhile, when the lower limit is exceeded, the distortion of the second lens unit I is somewhat excessively under-corrected. In the entirety of the photographic system, as much distortion of "under" tendency as not desirable remains either when in the initial state or when decentered.

Next, the theoretical background of the technique concerning the present invention is explained by using the theory of decentering aberrations. Various attempts to derive equations relating the decentering aberrations to the aberration coefficients have been made. Yet, here, the form which Matsui presented to the 23rd lecture of the Applied Physical Society in Japan (1962) is used. According to it, the aberration $(\Delta Y')$ after decentering in the domain of the third-order aberrations is expressed by the sum of the aberration $\Delta Y$ before decentering and the decentering aberration $\Delta Y(\epsilon)$ produced by decentering, as in an equation (8). The aberration $\Delta Y(\epsilon)$ which is newly produced when a certain lens surface tilts by an angle e is expressed as in an equation (9).

$$\Delta Y = \Delta Y + \Delta Y(\epsilon) \tag{8}$$

$$\Delta Y(\epsilon) = -\frac{\epsilon_P}{2\alpha'_K} \left[\!\left[ R^2(2 + \cos2\phi_R)(II\epsilon) + \right.\right. \tag{9}$$

$$2R(N_1\tan\omega)(\{2\cos(\phi_R - \phi_{H'}) + \cos(\phi_R + \phi_{H'})\}(III\epsilon) +$$

$$\cos\phi_R \cdot \cos\phi_{H'} \cdot P_E) + (N_1\tan\omega)^2\{(2 + \cos2\phi_{H'})(V\epsilon 1) -$$

$$\left.\left. (V\epsilon 2)\}\right]\!\right] - \frac{\epsilon_V}{2\alpha'_K}(\Delta\epsilon)$$

$$(V\epsilon 1) = \left(1 - \frac{1}{N_P}\right)\bar{a}_P + N_P\left(1 - \frac{1}{N_P^2}\right)h_P\bar{a}_P^2 - \tag{10}$$

$$(1 - N_P)(\bar{h}_P III_2 - h_P V_2)$$

$$(V\epsilon 2) = \left(1 - \frac{1}{N_P}\right)\bar{a}_P + (1 - N_P)\bar{h}_P P_2 \tag{11}$$

$$\Delta Y(\epsilon)_{dis} = -\frac{\epsilon_P}{2\alpha'_K}(\tan\omega)^2 \left( 2\left(1 - \frac{1}{N_P}\right)\bar{a}_P + \right. \tag{12}$$

$$3N_P\left(1 - \frac{1}{N_P^2}\right)h_P\bar{a}_P^2 +$$

$$\left. 3(1 - N_P)h_P V_2 - (1 - N_P)\bar{h}_P(3III_2 + P_2) \right)$$

$$3N_P\left(1 - \frac{1}{N_P^2}\right)h_P\bar{a}_P^2 + 3(1 - N_P)h_P V_2 \approx 0 \tag{13}$$

$$V_2 \approx \frac{(1 + N_P)}{N_P}\bar{a}_P^2 \tag{14}$$

Among this, on the decentering distortion $(V\epsilon 1)$ and the decentering distortion surplus aberration $(V\epsilon 2)$, when the tilted surface is applied as the flat surface to the variable vertical angle prism, their expressions in terms of the paraxial quantities and the aberration coefficients of the second lens unit are given in equations (10) and (11). On the assumption that the normal of the prism surface tilts in the meridional section plane, the decentering aberrations and the decentering surplus aberrations are collectively written as viewed in the meridian plane, being expressed by an equation (12).

In a case where the variable vertical angle prism is positioned within the lens system, as in the invention, the height $\bar{h}_P$ of the paraxial principal ray of the variable vertical angle prism becomes small in value. And, among others, the dominant value comes from the two of the terms in the braces of the equation (12) which are shown in an equation (13). Since the first term of the equation (13) takes a positive value, the value of the second term is negative. Hence, if $V_2 > 0$, it contributes to a reduction in the decentering distortion. If as good a correction of the decentering distortion as zero is desired, it is necessary that the distortion coefficient $V_2$ of the second lens unit satisfies an equation (14). In this case, too, for correction of the distortion of the entire system in the initial state, the distortion coefficient $V_1$ of the first lens unit must satisfy the equation (7).

Therefore, when the focal length of the entire system is normalized to unity, and when the off-axial principal ray which enters the lens system at an angle of inclination $\bar{a} = -1$ meets the variable vertical angle prism at an angle of inclination $\bar{a}_P$, if the third-order distortion coefficient of the second lens unit is determined so as to satisfy the following condition:

$$0.3 < V_2 \cdot N_P / ((1 + N_P) \bar{a}_P{}^2) < 3$$

a better result is obtained.

Further, in this embodiment, the first lens unit and the second lens unit each are divided by a largest axial air separation in each lens unit into a first lens front unit and a first lens rear unit, or a second lens front unit and a second lens rear unit, whose focal lengths are denoted respectively by $f_{I-1}$, $f_{I-2}$, $f_{II-1}$ and $f_{II-2}$. Furthermore, the values of these focal lengths are chosen so as to satisfy the following inequalities of conditions:

$$0.4 < f_{I-1}/f_T < 1.7 \quad (15)$$

$$0.05 < f_{II-2}/f_T < 0.7 \quad (16)$$

where $f_T$ is the focal length of the entire system. Since it implies that a positive lens unit of relatively strong power is arranged in a remote position from the variable vertical angle prism, not only the distortion with which the invention has its concern, but also other aberrations can be corrected without difficulty. So, when the focal lengths are short as exceeding the lower limits of the inequalities of condition (15) and the inequalities of condition (16), a large number of lens elements for correcting spherical aberration and astigmatism becomes necessary, although it is advantageous for correcting the distortion of each lens unit. Meanwhile, when the upper limits of the inequalities of conditions (15) and (16) are exceeded, the size of the optical system is increased objectionably.

Further, when such a power arrangement as to satisfy the following conditions:

$$0.1 < |f_{I-2}|/f_T < 0.7, \quad f_{I-2} < 0 \quad (17)$$

$$0.1 < |f_{II-1}|/f_T < 0.5, \quad f_{II-1} < 0 \quad (18)$$

$$0.25 < e_I/f_T < 0.9 \quad (19)$$

$$0.04 < e_{II}/f_T < 0.3 \quad (20)$$

where $e_I$ is the interval between the principal points of the first lens front unit and the first lens rear unit, and $e_{II}$ is the interval between the principal points of the second lens front unit and the second lens rear unit, is taken, a good optical performance can be worked out, despite the use of a lesser number of constituent lens elements.

When the powers of the first lens rear unit and the second lens front unit become strong as exceeding the lower limits of the inequalities of condition (17) and the inequalities of condition (18), spherical aberration and coma get difficult to correct. To preserve the optical performance, many lenses have to be used. Also, when the principal point intervals become long as exceeding the upper limits of the inequalities of condition (19) and the inequalities of condition (20), the total length of the lens system gets too long.

Meanwhile, effective means for under-correcting the distortion of the second lens unit is to arrange a lens having a positive refractive power and convex toward the object in a farther position of the image side than $\frac{1}{2}$ of the total length of the second lens unit. And, it is desirable that the radius of curvature Rx of that convex surface lies in the following range:

$$0 < 1/Rx < 6/f_T$$

When the curvature becomes tight as exceeding the upper limit, astigmatism and coma get difficult to correct.

By the way, in the equation (12), when the height of the off-axial principal ray on the variable vertical angle prism increases in absolute value, the amount of contribution of the terms for astigmatism and Petzval sum of the second lens unit comes to increase. In the lens system to be corrected for distortion as in the invention, $(3III_2 + P_2)$ takes a positive value. The fact that the value of $\bar{h}_P$ is positive and gets large is, therefore, disadvantageous on correction of the decentering distortion. Since the $\bar{h}_P$ is in relation to the distance 1 from the diaphragm to the variable vertical angle prism, as this distance is measured based on the focal length of the entire system normalized to unity, the position of the variable vertical angle prism is preferably determined so as to satisfy the following condition:

$$-0.4 < 1 < 0.25 \quad (21)$$

When the variable vertical angle prism is positioned forward in the optical system as exceeding the lower limit, the diameter of the variable vertical angle prism gets larger, causing the significance of incorporation of the prism to diminish.

Figure 4:
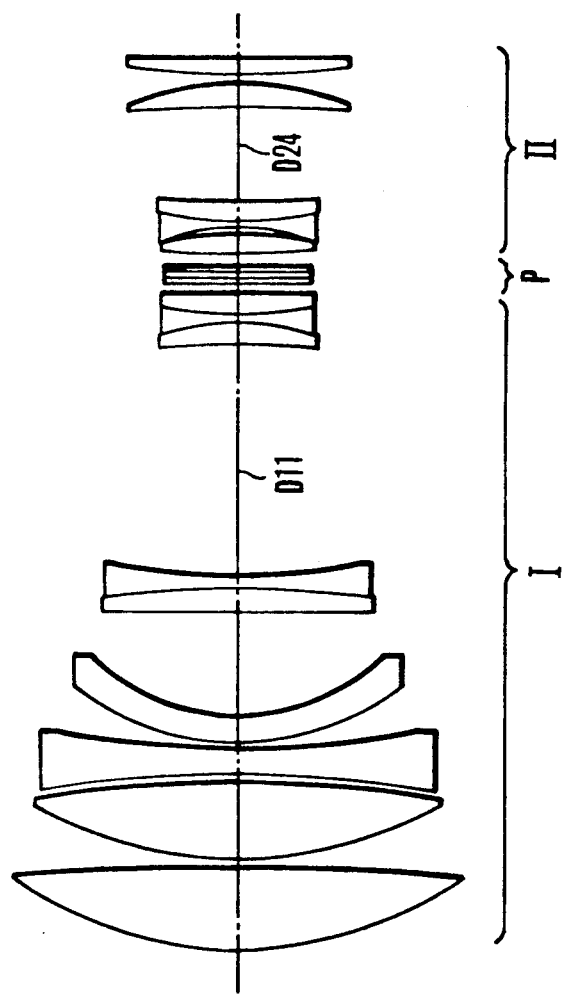

FIG. 4 shows a specific example of the embodiment of the invention usable as the vibration-proof optical system. The system comprises, from front to rear, a first lens unit I which is stationary during decentering, a variable vertical angle prism P and a second lens unit II which is another lens unit stationary during decentering. By the output of the above-described acceleration detector 1, the actuator 2 varies the vertical angle of the variable vertical angle prism so that the image is deflected so as to reversely compensate for the image blur. The variable vertical angle prism P is formed by two parallel flat glass plates sandwiching a transparent silicon rubber.

In this example, the 3rd-order distortion coefficient $V_1$ of the first lens unit I has a value of $-9.03$, and the 3rd-order distortion coefficient $V_2$ of the second lens unit II has a value of 7.8. That is, the first lens unit I is made to produce the over-corrected distortion, and the second lens unit II to produce the under-corrected distortion. Nonetheless, the entire system is corrected for distortion to such a small value of 0.27% at an image height of 21.63 mm. This leads, because of the 3rd-order distortion coefficient $V_2$ of the second lens unit II as $V_2 > 0$, to correct the decentering distortion to such a minimum as 0.017 mm at an image height of 18 mm when the image is deflected 1 mm by the variable vertical angle prism. Here the decentering distortion is defined by the difference between the amount of deflection of the principal ray of the off-axial light beam and the amount of deflection of the principal ray of that beam which focuses on the center of the image plane. As an example of control, even if a given lens has the same power arrangement, but does not employ the principle of the invention, in other words, does employ the frontmost arrangement of the variable vertical angle prism, the 1 mm deflection of the central point concurs with 1,064 mm deflection of a marginal point of 18 mm in the image height. Hence the decentering distortion takes as great a value as 0.064.

In this example of the invention, the first lens unit II is divided by an air separation $D_{11}$ into, from the object side, the first positive lens front unit I-1 and a first negative lens rear unit I-2, and the second lens unit II is divided by an air separation $D_{24}$ into, from the object side, a second negative lens front unit II-1 and a second positive lens rear unit II-2, the power distribution over the first lens unit I and the second lens unit II being made such that the distortion can easily satisfy the inequalities of conditions (6) and (7).

In the invention, it should be understood that the principle of the invention can advantageously be applied even to another type of variable vertical angle prism in which, as shown in FIG. 3, a plano-concave lens $P_1$ and a plano-convex lens $P_2$ whose confronting surfaces are spherical with their radius of curvature having almost equal values to each other are rotated along the spherical surface relative to each other.

Also, the invention is not confined to the vibration proof device, and is applicable to other like optical instruments such as shift lenses or auto-level instruments.

In the invention, the surfaces of both sides of the variable vertical angle prism are not necessarily completely flat, but may be made curved so that the prism itself has lens functions, provided its radius of curvature falls in a range of $1.5f_T < |R|$.

By the way, the term "fixed" lens unit used in the foregoing discussion means that the lens unit is stationary against decentering, and, therefore it may be moved along the optical axis for focusing and/or zooming purposes.

Figure 13:
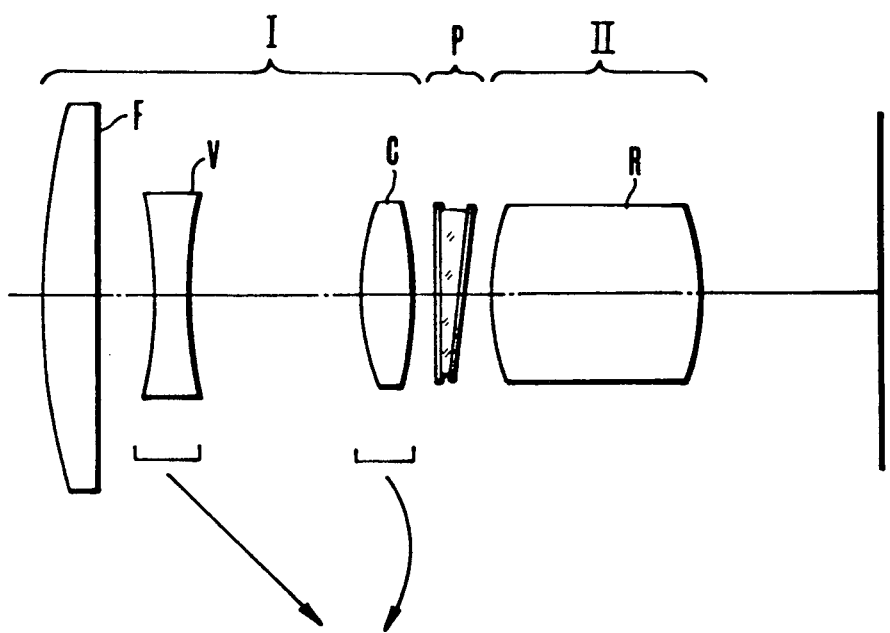
FIG. 13 is a lens block diagram illustrating another practical example of the invention.
Figure 14A:
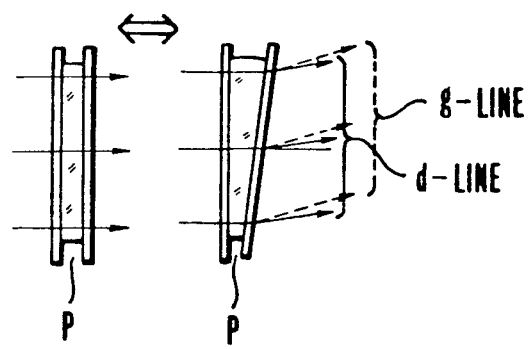
FIGS. 14(A) and 14(B) are diagrams to explain production of a decentering lateral chromatic aberration.
Figure 14B:
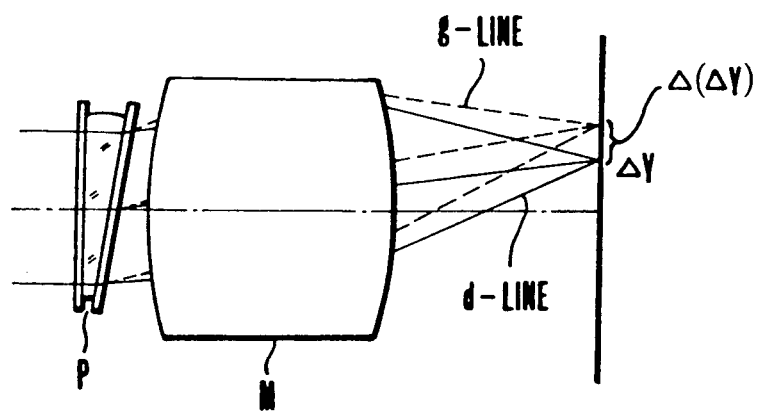
Figure 15:
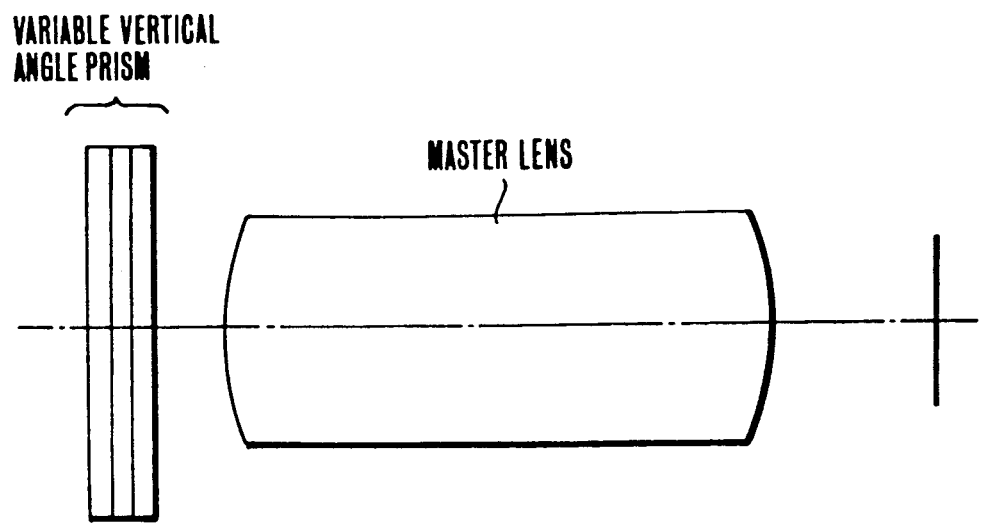
FIG. 15 is a schematic view illustrating the general case of the conventional arrangements of the variable vertical angle prism.

This is exemplified in FIG. 13. The first lens unit I is constructed with, from front to rear, a focusing lens F axially movable for focusing, a variator lens V and a compensator lens C, the latter two of which are axially moved when zooming.

The second lens unit II is constructed with a relay lens R which fulfills the image forming function. And, while over-correction of the distortion of the first lens unit I is preserved, under-correction of the distortion of the second lens unit is held.

Next, numerical examples 1 to 4 of the invention are shown. In the numerical examples 1 to 4, Ri is the radius of curvature of the i-th lens surface counting from front, Di is the i-th lens thickness or air separation counting from front, and Ni and $\nu i$ are the refractive index and Abbe number of the glass of the i-th lens element counting from front.

Figure 16A:
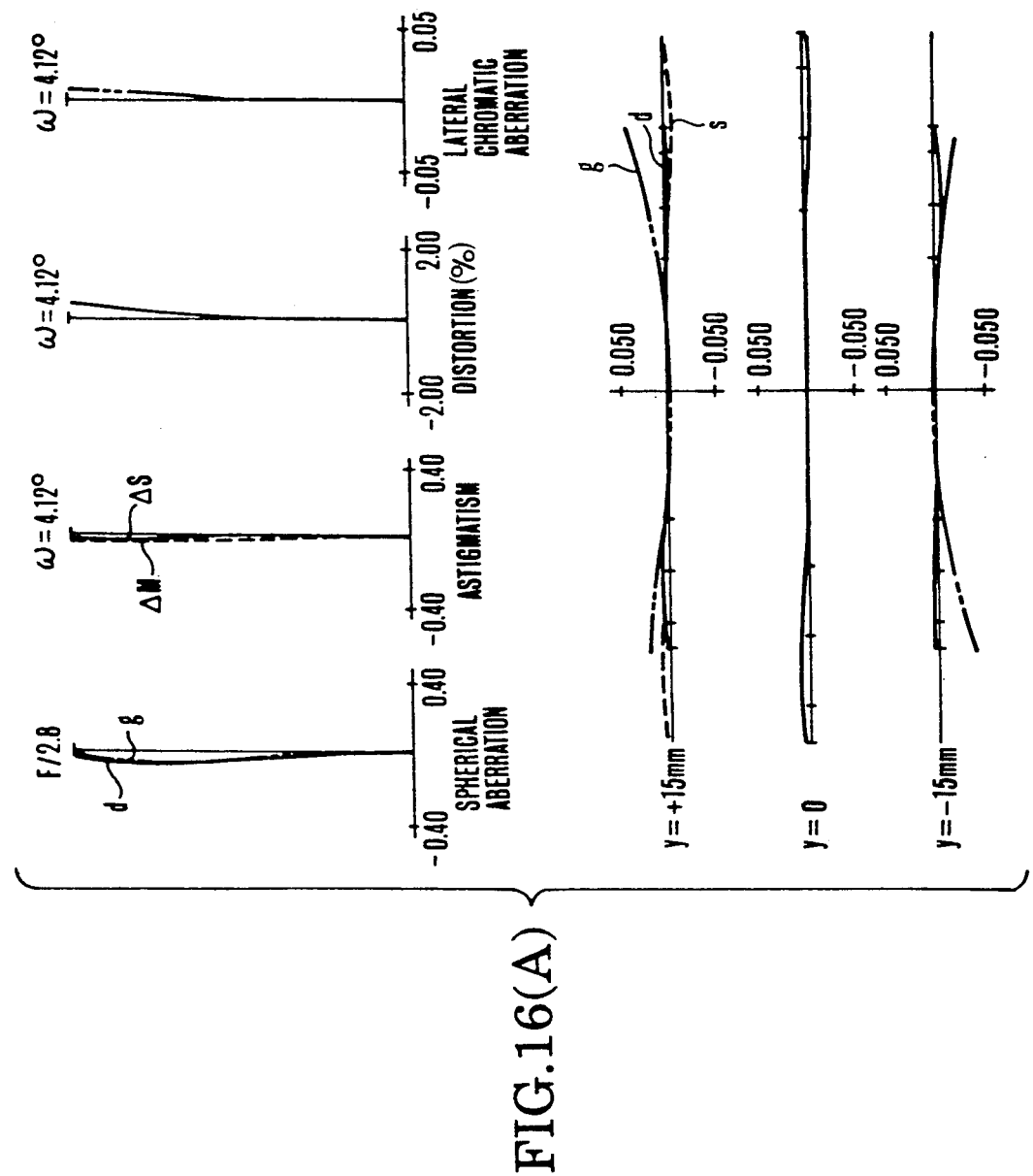
Figure 17A:
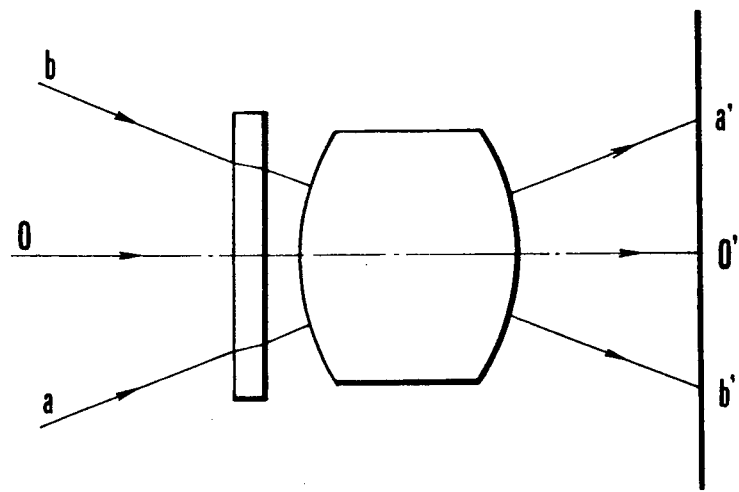
FIGS. 17(A) and 17(B) are diagrams to explain the decentering distortion.
Figure 17B:
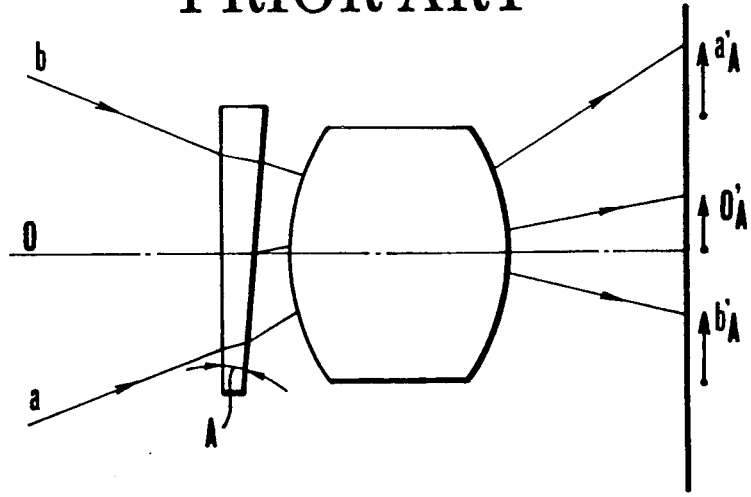
Figure 18:
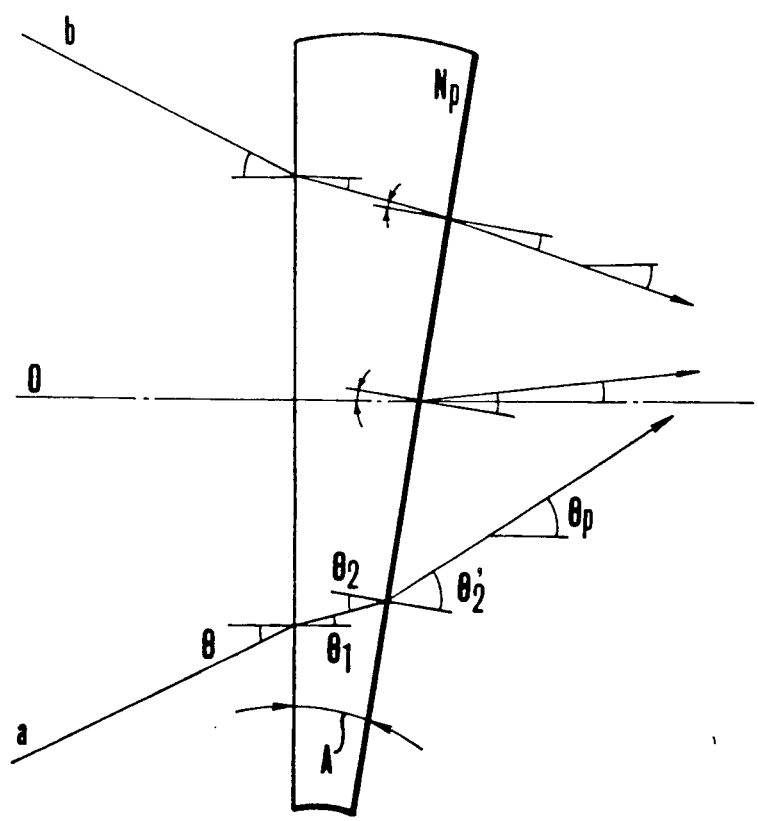
FIG. 18 is a diagram illustrating rays of light traveling through the variable vertical angle prism.

For the purpose of comparative reference, the various aberrations in a case where the variable vertical angle prism of the numerical example 1 is disposed on the object side of the first lens unit are shown in FIGS. 16(A) and 16(B).

Figure 1:
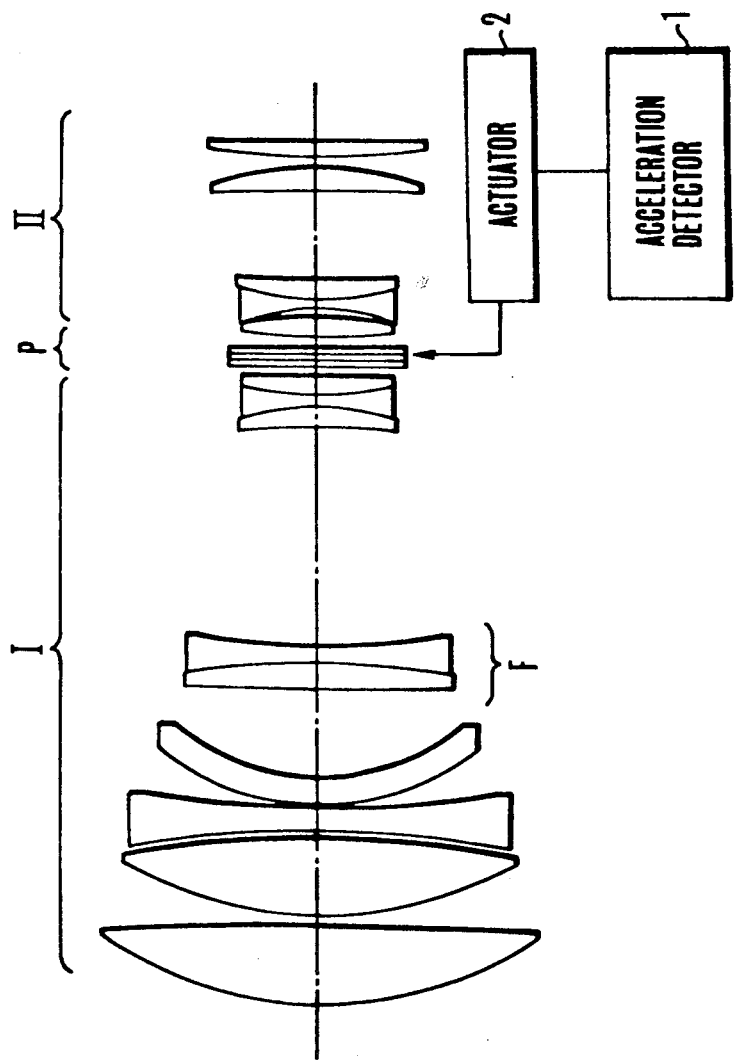
FIG. 1, FIG. 2, FIG. 3 and FIG. 4 are longitudinal section views of numerical examples 1, 2, 3 and 4 of lenses of the invention, respectively.
Figure 2:
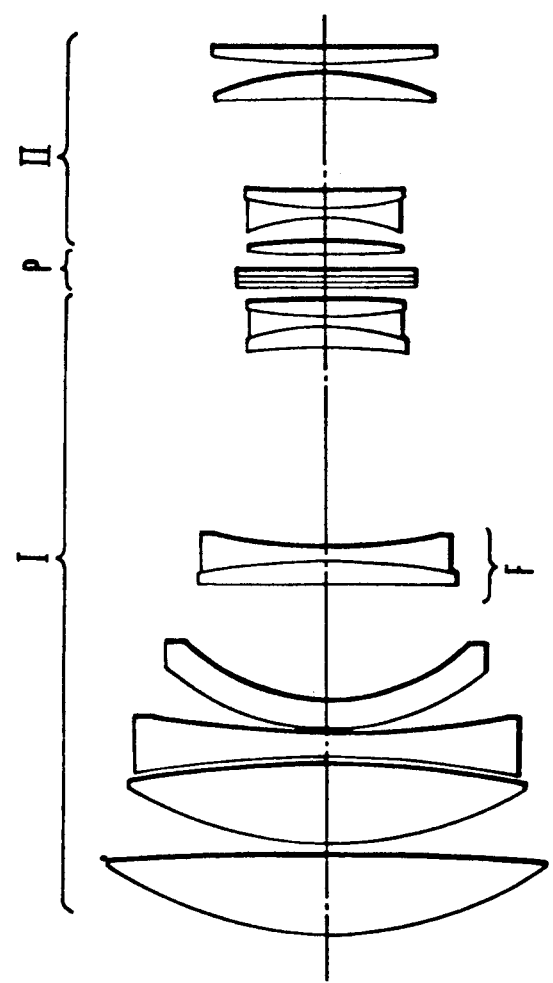
Figure 5A:
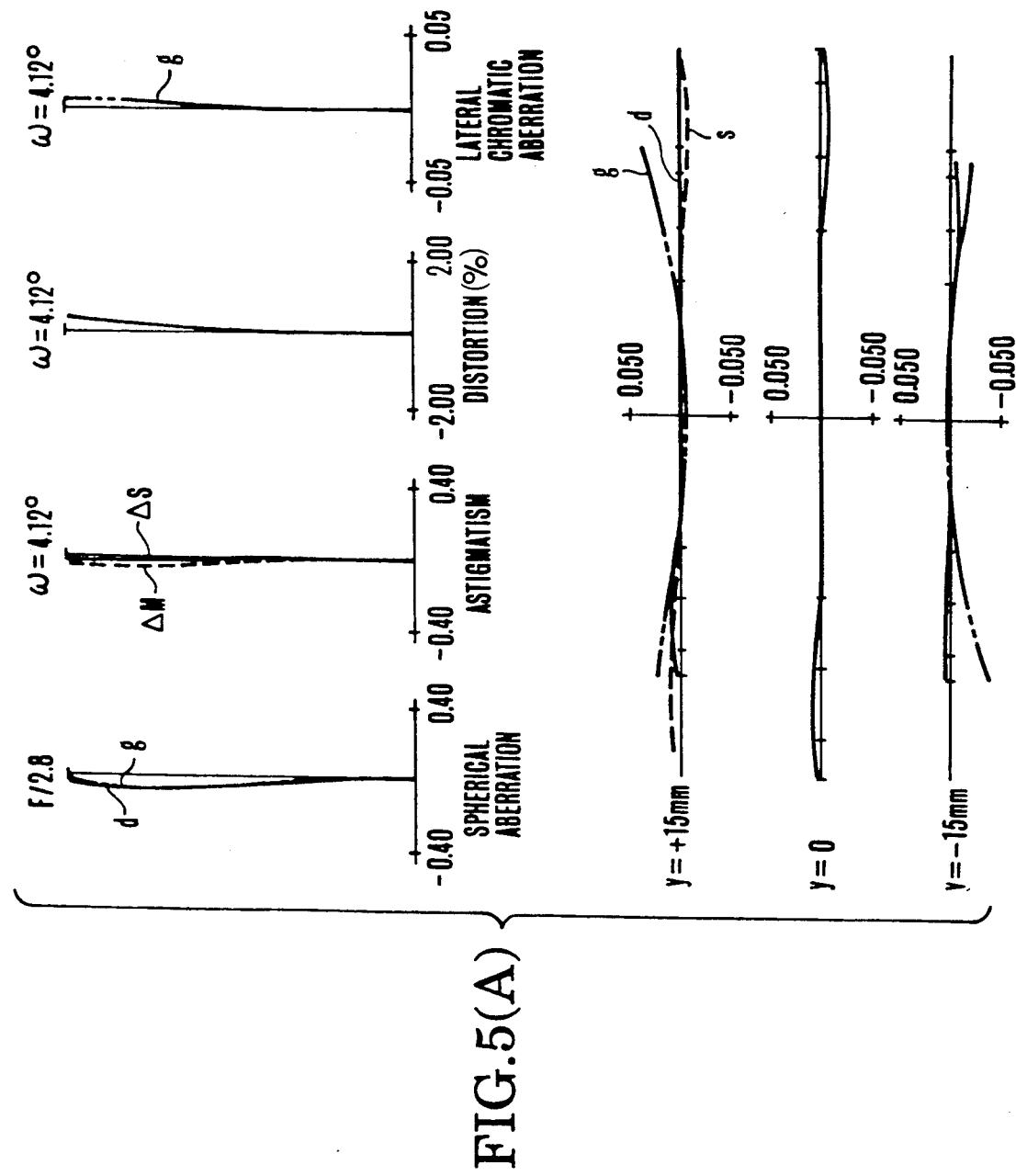
Figure 5B:
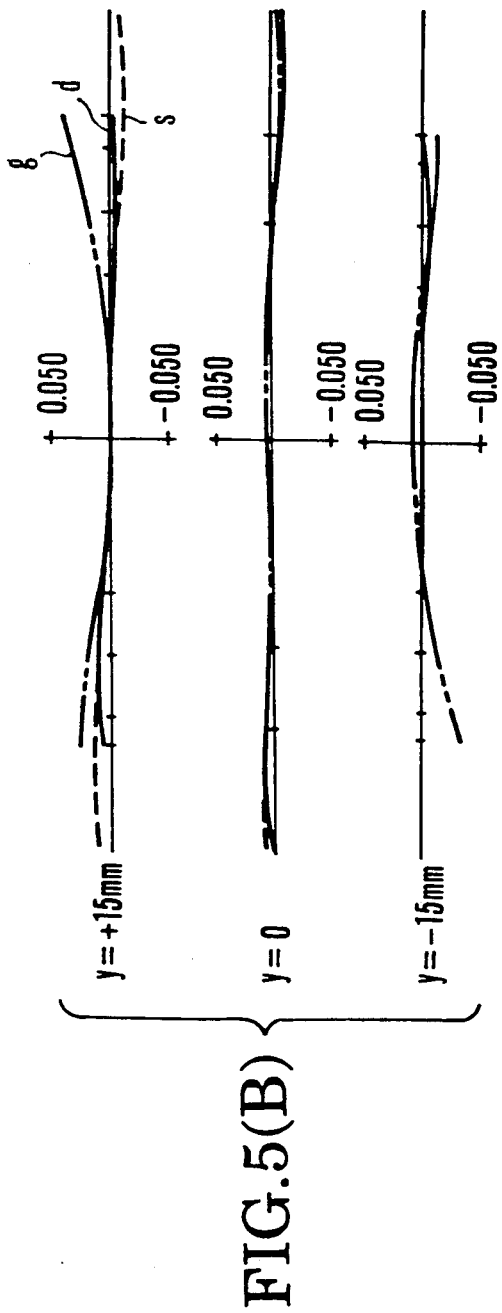
Figure 6A:
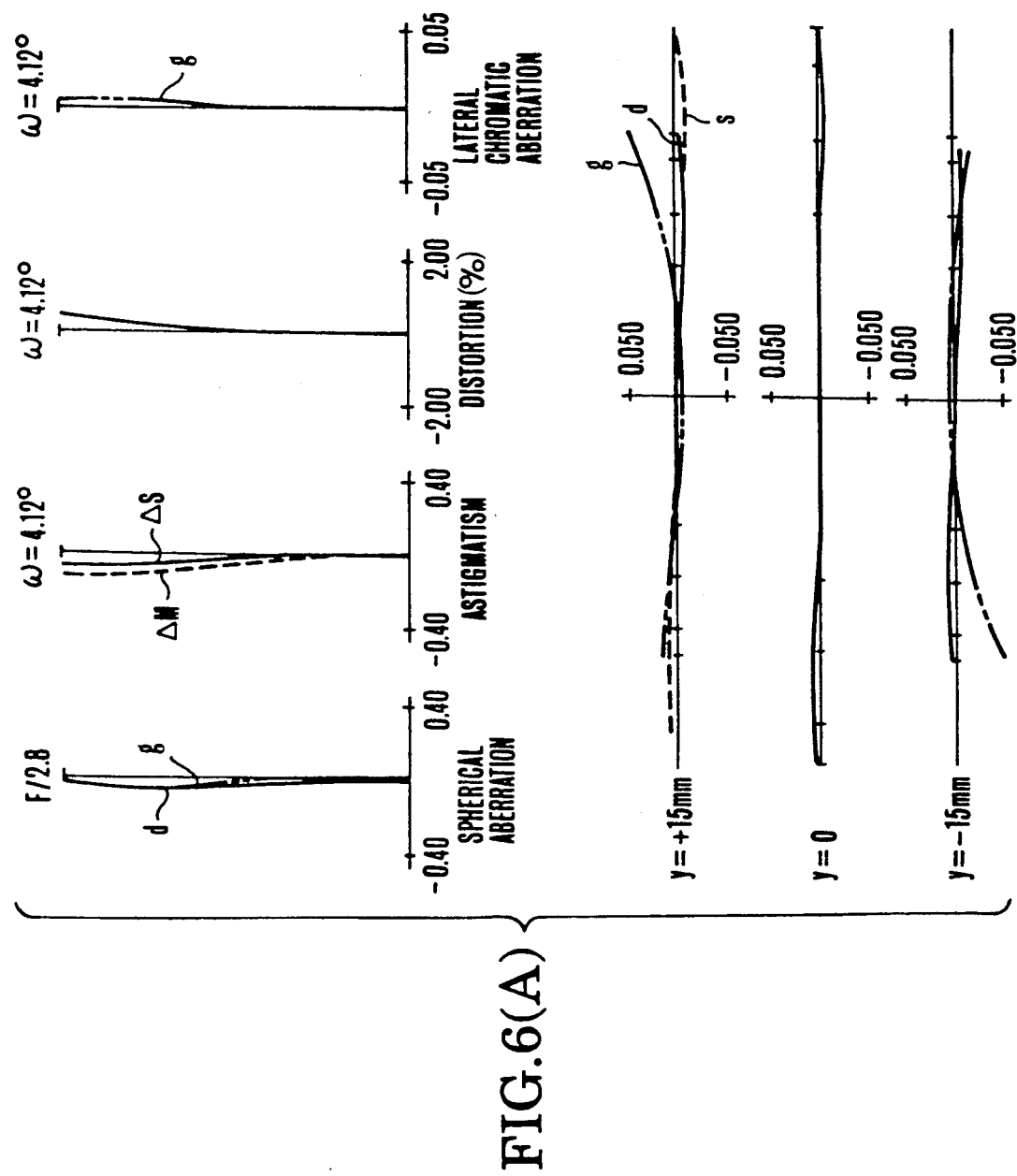
Figure 6B:
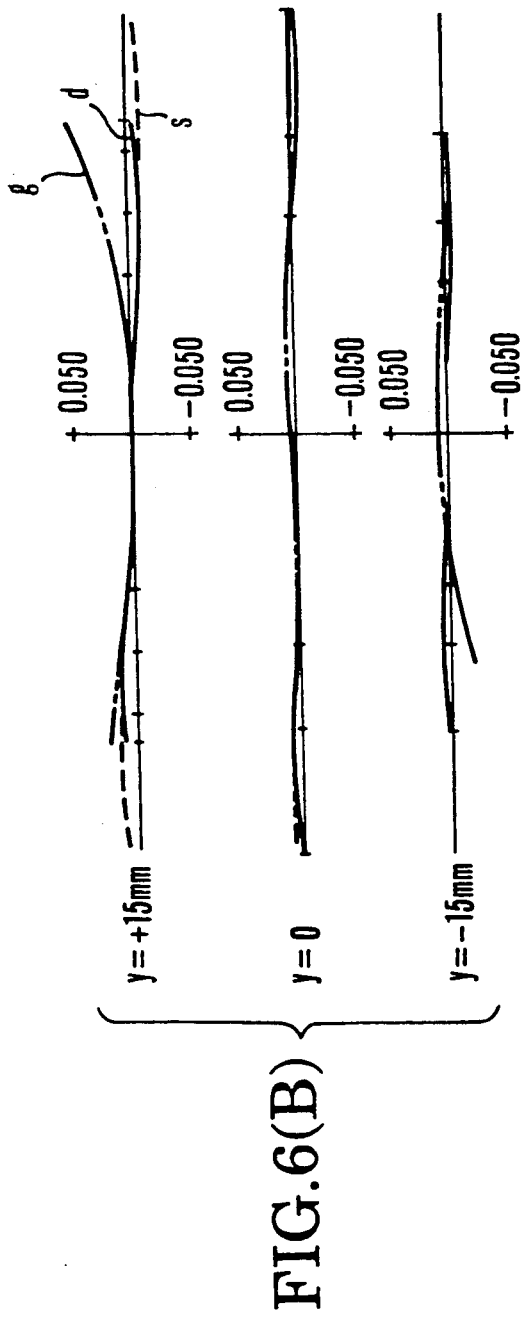

| | | Numerical Example 1 (FIGS. 1, 5(A) and 5(B)): | | |
|---|---|---|---|---|
| | | $F = 300$   $FNo = 1:2.8$   $2\omega = 8.25°$ | | |
| I | R 1 = 96.18 | D 1 = 19.43 | N 1 = 1.43387 | $\nu$ 1 = 95.1 |
| | R 2 = −711.77 | D 2 = 1.23 | | |
| | R 3 = 98.44 | D 3 = 19.13 | N 2 = 1.49700 | $\nu$ 2 = 81.6 |
| | R 4 = −272.22 | D 4 = 0.06 | | |
| | R 5 = −271.04 | D 5 = 5.63 | N 3 = 1.77250 | $\nu$ 3 = 49.6 |
| | R 6 = 252.88 | D 6 = 0.51 | | |
| | R 7 = 64.31 | D 7 = 6.14 | N 4 = 1.56873 | $\nu$ 4 = 63.1 |
| | R 8 = 51.74 | D 8 = 21.42 | | |
| | R 9 = 2696.29 | D 9 = 6.14 | N 5 = 1.80518 | $\nu$ 5 = 25.4 |
| | R10 = −184.77 | D10 = 2.56 | N 6 = 1.56873 | $\nu$ 6 = 63.1 |
| | R11 = 152.12 | D11 = 50.52 | | |
| | R12 = −161.23 | D12 = 5.11 | N 7 = 1.49700 | $\nu$ 7 = 81.6 |
| | R13 = −60.17 | D13 = 1.84 | N 8 = 1.87400 | $\nu$ 8 = 35.3 |
| | R14 = 91.38 | D14 = 5.11 | N 9 = 1.49700 | $\nu$ 9 = 81.6 |
| | R15 = −403.38 | D15 = 1.82 | | |
| P | R16 = ∞ | D16 = 1.23 | N10 = 1.51633 | $\nu$10 = 64.1 |
| | R17 = ∞ | D17 = 1.53 | N11 = 1.40586 | $\nu$11 = 52.2 |
| | R18 = ∞ | D18 = 1.23 | N12 = 1.51633 | $\nu$12 = 64.1 |
| | R19 = ∞ | D19 = 3.27 | | |
| II | R20 = 316.69 | D20 = 4.30 | N13 = 1.49700 | $\nu$13 = 81.6 |
| | R21 = −87.99 | D21 = 1.70 | | |
| | R22 = −49.39 | D22 = 1.53 | N14 = 1.69895 | $\nu$14 = 30.1 |
| | R23 = 71.98 | D23 = 4.60 | N15 = 1.77250 | $\nu$15 = 49.6 |
| | R24 = 257.34 | D24 = 21.49 | | |
| | R25 = −542.73 | D25 = 6.14 | N16 = 1.80100 | $\nu$16 = 35.0 |
| | R26 = −66.92 | D26 = 0.10 | | |
| | R27 = 189.71 | D27 = 4.09 | N17 = 1.85026 | $\nu$17 = 32.3 |
| | R28 = 7990.34 | | | |
| | | Numerical Example 2 (FIGS. 2, 6(A) and 6(B)): | | |
| | | $F = 300$   $FNo = 1:2.8$   $2\omega = 8.25°$ | | |
| I | R 1 = 95.65 | D 1 = 19.43 | N 1 = 1.43387 | $\nu$ 1 = 95.1 |
| | R 2 = −741.73 | D 2 = 1.23 | | |
| | R 3 = 96.99 | D 3 = 19.13 | N 2 = 1.49700 | $\nu$ 2 = 81.6 |
| | R 4 = −271.67 | D 4 = 0.05 | | |
| | R 5 = −271.28 | D 5 = 5.63 | N 3 = 1.77250 | $\nu$ 3 = 49.6 |
| | R 6 = 251.37 | D 6 = 0.51 | | |
| | R 7 = 63.25 | D 7 = 6.14 | N 4 = 1.56873 | $\nu$ 4 = 63.1 |
| | R 8 = 50.52 | D 8 = 26.68 | | |
| | R 9 = −9263.01 | D 9 = 6.14 | N 5 = 1.80518 | $\nu$ 5 = 25.4 |
| | R10 = −154.19 | D10 = 2.56 | N 6 = 1.56873 | $\nu$ 6 = 63.1 |
| | R11 = 132.00 | D11 = 47.14 | | |
| | R12 = −139.34 | D12 = 5.11 | N 7 = 1.49700 | $\nu$ 7 = 81.6 |
| | R13 = −56.66 | D13 = 1.84 | N 8 = 1.87400 | $\nu$ 8 = 35.3 |

-continued

|   |   |   |   |   |
|---|---|---|---|---|
|   | R14 = 111.76 | D14 = 5.11 | N 9 = 1.49700 | ν 9 = 81.6 |
|   | R15 = −211.44 | D15 = 1.82 |   |   |
| P | R16 = ∞ | D16 = 1.23 | N10 = 1.51633 | ν10 = 64.1 |
|   | R17 = ∞ | D17 = 1.53 | N11 = 1.40586 | ν11 = 52.2 |
|   | R18 = ∞ | D18 = 1.23 | N12 = 1.51633 | ν12 = 64.1 |
|   | R19 = ∞ | D19 = 3.27 |   |   |
|   | R20 = 229.36 | D20 = 4.30 | N13 = 1.49700 | ν13 = 81.6 |
|   | R21 = −96.85 | D21 = 4.64 |   |   |
|   | R22 = −49.51 | D22 = 1.53 | N14 = 1.69895 | ν14 = 30.1 |
|   | R23 = 71.51 | D23 = 4.60 | N15 = 1.77250 | ν15 = 49.6 |
| II | R24 = 251.81 | D24 = 21.36 |   |   |
|   | R25 = −411.68 | D25 = 6.14 | N16 = 1.80100 | ν16 = 35.0 |
|   | R26 = −64.93 | D26 = 0.10 |   |   |
|   | R27 = 192.44 | D27 = 4.09 | N17 = 1.85026 | ν17 = 32.3 |
|   | R28 = −24062.97 |   |   |   |

Figure 7A:
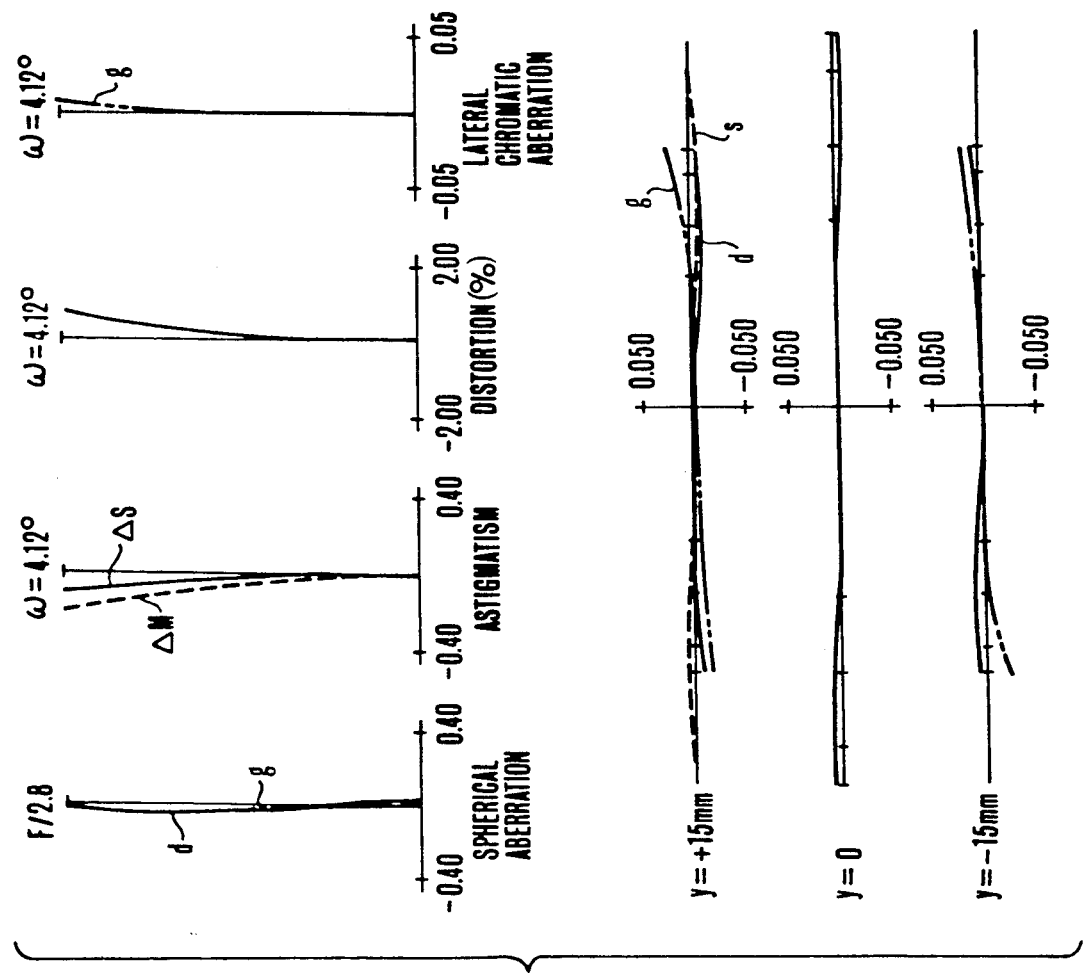
Figure 7B:
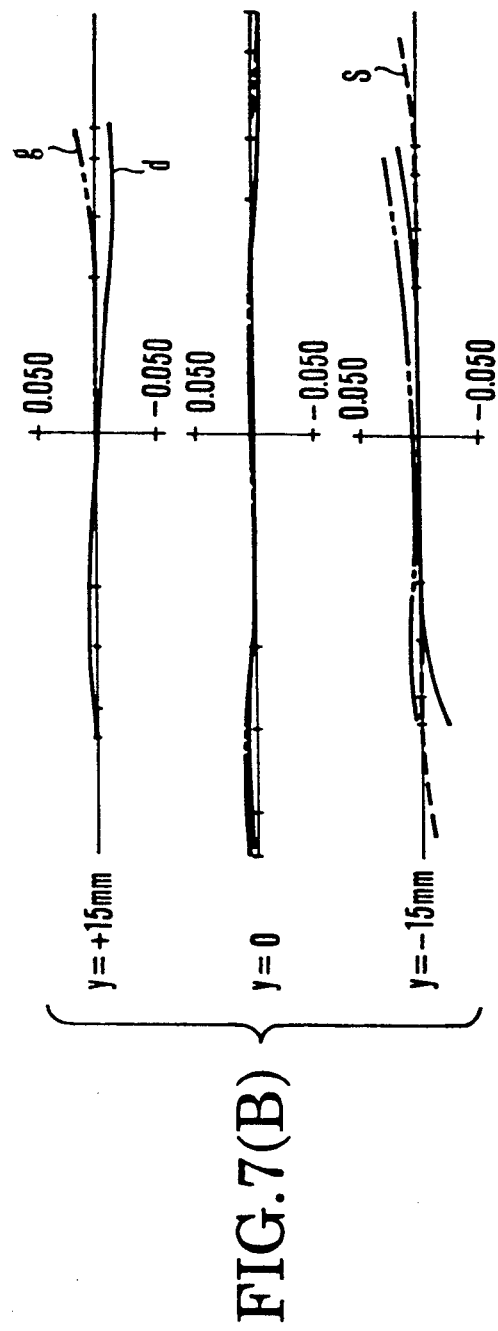

Numerical Example 3 (FIGS. 3, 7(A) and 7(B)):
F = 300    FNo = 1:2.8    2ω = 8.25°

|   |   |   |   |   |
|---|---|---|---|---|
|   | R 1 = 101.64 | D 1 = 19.43 | N 1 = 1.43387 | ν 1 = 95.1 |
|   | R 2 = −509.25 | D 2 = 1.23 |   |   |
|   | R 3 = 91.48 | D 3 = 19.13 | N 2 = 1.49700 | ν 2 = 81.6 |
|   | R 4 = −261.73 | D 4 = 0.05 |   |   |
|   | R 5 = −261.27 | D 5 = 5.63 | N 3 = 1.77250 | ν 3 = 49.6 |
|   | R 6 = 289.64 | D 6 = 0.51 |   |   |
|   | R 7 = 56.21 | D 7 = 6.14 | N 4 = 1.56873 | ν 4 = 63.1 |
| I | R 8 = 44.83 | D 8 = 45.40 |   |   |
|   | R 9 = −217.18 | D 9 = 6.14 | N 5 = 1.80518 | ν 5 = 25.4 |
|   | R10 = −67.33 | D10 = 2.56 | N 6 = 1.61340 | ν 6 = 43.8 |
|   | R11 = 73.09 | D11 = 31.68 |   |   |
|   | R12 = −705.27 | D12 = 5.83 | N 7 = 1.62374 | ν 7 = 47.1 |
|   | R13 = −54.07 | D13 = 1.84 | N 8 = 1.80400 | ν 8 = 46.6 |
|   | R14 = 453.26 | D14 = 1.53 |   |   |
|   | R15 = ∞ | D15 = 1.02 | N 9 = 1.51633 | ν 9 = 64.1 |
| P | R16 = 86.943 | D16 = 0.01 | N10 = 1.40590 | ν10 = 52.8 |
|   | R17 = 86.943 | D17 = 3.58 | N11 = 1.51633 | ν11 = 64.1 |
|   | R18 = ∞ | D18 = 2.35 |   |   |
|   | R19 = 172.81 | D19 = 4.30 | N12 = 1.49700 | ν12 = 81.6 |
|   | R20 = −91.97 | D20 = 1.53 |   |   |
|   | R21 = −51.59 | D21 = 2.05 |   |   |
|   | R22 = −685.33 | D22 = 17.07 | N13 = 1.92286 | ν13 = 20.9 |
| II | R23 = −218.21 | D23 = 5.11 | N14 = 1.72342 | ν14 = 38.0 |
|   | R24 = −57.44 | D24 = 0.10 |   |   |
|   | R25 = 242.37 | D25 = 5.83 | N15 = 1.80518 | ν15 = 25.4 |
|   | R26 = −316.54 |   |   |   |

Figure 8A:
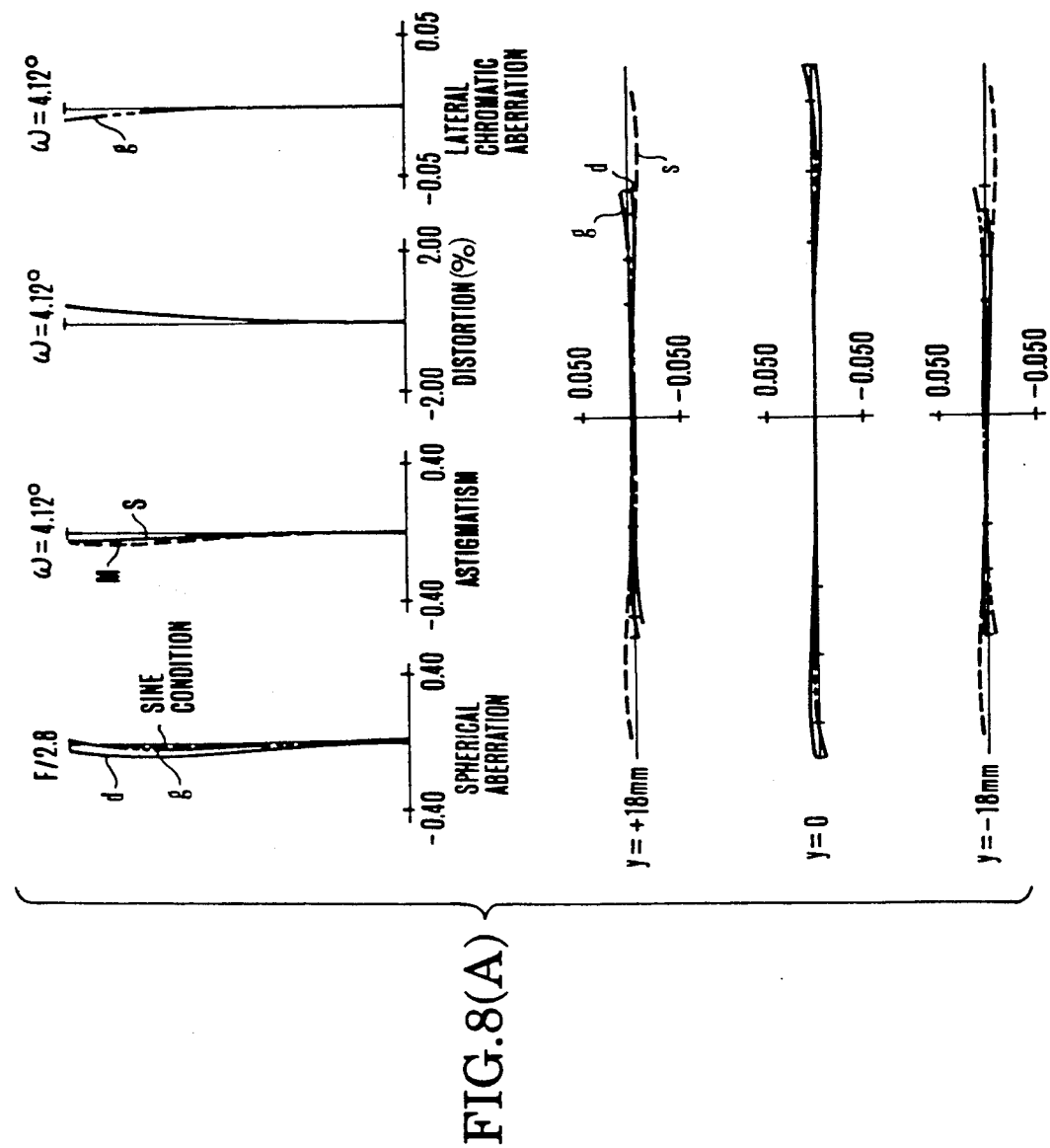

Numerical Example 4 (FIGS. 4, 8(A) and 8(B)):
F = 300    FNo = 1:2.8    2ω = 4.12° × 2

|   |   |   |   |   |
|---|---|---|---|---|
|   | R 1 = 93.881 | D 1 = 19.00 | N 1 = 1.43387 | ν 1 = 95.1 |
|   | R 2 = −688.067 | D 2 = 1.20 |   |   |
|   | R 3 = 96.924 | D 3 = 18.70 | N 2 = 1.49700 | ν 2 = 81.6 |
|   | R 4 = −266.781 | D 4 = 0.07 |   |   |
|   | R 5 = −265.227 | D 5 = 5.50 | N 3 = 1.77250 | ν 3 = 49.6 |
|   | R 6 = 240.777 | D 6 = 0.50 |   |   |
|   | R 7 = 63.621 | D 7 = 6.00 | N 4 = 1.56873 | ν 4 = 63.2 |
| I | R 8 = 50.598 | D 8 = 23.87 |   |   |
|   | R 9 = 5592.156 | D 9 = 6.00 | N 5 = 1.80518 | ν 5 = 25.4 |
|   | R10 = −216.984 | D10 = 2.50 | N 6 = 1.56873 | ν 6 = 63.2 |
|   | R11 = 144.703 | D11 = 53.96 |   |   |
|   | R12 = −157.856 | D12 = 5.00 | N 7 = 1.56732 | ν 7 = 42.8 |
|   | R13 = −54.913 | D13 = 1.80 | N 8 = 1.87400 | ν 8 = 35.3 |
|   | R14 = 107.744 | D14 = 5.00 | N 9 = 1.49700 | ν 9 = 81.6 |
|   | R15 = −392.038 | D15 = 1.79 |   |   |
|   | R16 = ∞ | D16 = 1.20 | N10 = 1.51633 | ν10 = 64.1 |
| P | R17 = ∞ | D17 = 1.50 | N11 = 1.40586 | ν11 = 52.2 |
|   | R18 = ∞ | D18 = 1.20 | N12 = 1.51633 | ν12 = 64.1 |
|   | R19 = ∞ | D19 = 3.20 |   |   |
|   | R20 = 361.833 | D20 = 4.20 | N13 = 1.49700 | ν13 = 81.6 |
|   | R21 = −84.502 | D21 = 1.57 |   |   |
|   | R22 = −48.693 | D22 = 1.50 | N14 = 1.69895 | ν14 = 30.1 |
|   | R23 = 87.185 | D23 = 4.50 | N15 = 1.76200 | ν15 = 40.1 |
| II | R24 = 268.024 | D24 = 22.06 |   |   |
|   | R25 = −659.817 | D25 = 6.00 | N16 = 1.80610 | ν16 = 40.9 |
|   | R26 = −67.396 | D26 = 0.10 |   |   |
|   | R27 = 195.860 | D27 = 4.00 | N17 = 1.85026 | ν17 = 32.3 |
|   | R28 = 46308.430 |   |   |   |

Note:
Diaphragm is positioned 2.5 behind the lens surface R19.

The Values of Aberration Coefficients of Numerical Example 4:

| No | L | T | SA | CM |
|---|---|---|---|---|
| 1 | 0.012525 | −0.016137 | 6.886133 | −8.872342 |
| 2 | 0.007261 | −0.015205 | 3.252340 | −6.810834 |
| 3 | 0.006180 | −0.004566 | −0.368483 | 0.272213 |
| 4 | 0.017642 | −0.031378 | 32.396133 | −57.618729 |

-continued

|   | No | | | | |
|---|---|---|---|---|---|
| I | 5 | −0.038649 | 0.068725 | −39.557358 | 70.341095 |
|   | 6 | 0.008768 | −0.023937 | 0.919060 | −2.508986 |
|   | 7 | 0.009080 | −0.006332 | −0.725650 | 0.505984 |
|   | 8 | −0.013540 | 0.012601 | −0.100600 | 0.093623 |
|   | 9 | −0.022068 | 0.051152 | −1.717885 | 3.981879 |
|   | 10 | 0.028708 | −0.051567 | 1.330156 | −2.389322 |
|   | 11 | 0.000050 | −0.007122 | 0.000039 | −0.005478 |
|   | 12 | −0.007023 | 0.012970 | −1.033438 | 1.908631 |
|   | 13 | −0.008064 | 0.008085 | −1.261558 | 1.264706 |
|   | 14 | −0.006429 | −0.010769 | −0.102854 | −0.172286 |
|   | 15 | 0.000454 | −0.005059 | 0.001393 | −0.015517 |
| P | 16 | 0.000000 | 0.006516 | 0.000000 | 0.000000 |
|   | 17 | 0.000000 | 0.000438 | 0.000000 | 0.000000 |
|   | 18 | 0.000000 | −0.000438 | 0.000000 | 0.000000 |
|   | 19 | 0.000000 | −0.006516 | 0.000000 | 0.000000 |
| II | 20 | 0.000492 | 0.005068 | 0.001771 | 0.018246 |
|   | 21 | 0.003373 | −0.004366 | 0.902637 | −1.168394 |
|   | 22 | −0.017174 | 0.013820 | −2.703681 | 2.175650 |
|   | 23 | −0.003758 | −0.005058 | 0.102784 | 0.138360 |
|   | 24 | −0.006323 | −0.015923 | −0.440755 | −1.110013 |
|   | 25 | 0.004291 | 0.017501 | 0.138599 | 0.565223 |
|   | 26 | 0.013907 | −0.001242 | 1.833909 | −0.163812 |
|   | 27 | 0.001641 | 0.020002 | −0.002826 | −0.034449 |
|   | 28 | 0.007747 | −0.011147 | 0.295220 | −0.424786 |
|   | 1−28 | −0.000907 | 0.000116 | 0.045092 | −0.029336 |

|   | No | AS | PT | DS |
|---|---|---|---|---|
| I | 1 | 11.431445 | 0.966930 | −15.974514 |
|   | 2 | 14.262794 | 0.131929 | −30.144455 |
|   | 3 | −0.201095 | 1.027604 | −0.610576 |
|   | 4 | 102.478821 | 0.373337 | −182.929550 |
|   | 5 | −125.080917 | −0.492964 | 223.296127 |
|   | 6 | 6.849408 | −0.543023 | −17.216110 |
|   | 7 | −0.352814 | 1.709534 | −0.946019 |
|   | 8 | −0.087130 | −2.149543 | 2.081547 |
|   | 9 | −9.229578 | 0.023928 | 21.337723 |
|   | 10 | 4.291872 | 0.115442 | −7.916732 |
|   | 11 | 0.778126 | −0.751627 | −3.764283 |
|   | 12 | −3.525006 | −0.687911 | 7.780738 |
|   | 13 | −1.267860 | −0.570416 | 1.842863 |
|   | 14 | −0.288588 | −0.374177 | −1.110165 |
|   | 15 | 0.172886 | 0.254054 | −4.756977 |
| P | 16 | 0.000000 | 0.000000 | 4.773492 |
|   | 17 | 0.000000 | 0.000000 | −0.600082 |
|   | 18 | 0.000000 | 0.000000 | 0.600082 |
|   | 19 | 0.000000 | 0.000000 | −4.773492 |
| II | 20 | 0.187955 | 0.275262 | 4.771612 |
|   | 21 | 1.512398 | 1.178659 | −3.483370 |
|   | 22 | −1.750744 | −2.534649 | 3.448452 |
|   | 23 | 0.186251 | 0.072477 | 0.348282 |
|   | 24 | −2.795498 | −0.484057 | −8.259356 |
|   | 25 | 2.305047 | −0.202929 | 8.572684 |
|   | 26 | 0.014632 | 1.986717 | −0.178768 |
|   | 27 | −0.419920 | 0.703873 | 3.461258 |
|   | 28 | 0.611215 | −0.002977 | −0.875181 |
|   | 1−28 | 0.083705 | 0.025475 | −1.224773 |

| The values of Block Aberration Coefficients: | | | | |
|---|---|---|---|---|
|   | L | T | SA | CM |
| I | −0.005104 | −0.018538 | −0.082566 | −0.025361 |
| P | 0.000000 | 0.000000 | 0.000000 | 0.000000 |
| II | 0.004197 | 0.018654 | 0.127658 | −0.003975 |

|   | AS | PT | DS |
|---|---|---|---|
| I | 0.232369 | −0.966903 | −9.030387 |
| P | 0.000000 | 0.000000 | 0.000000 |
| II | −0.148664 | 0.992378 | 7.805613 |

Note:
L for lateral chromatic aberration;
T for longitudinal chromatic aberration;
SA for spherical aberration;
CM for coma;
AS for astigmatism;
PT for Petzval sum; and
DS for distortion.

Figure 19A:
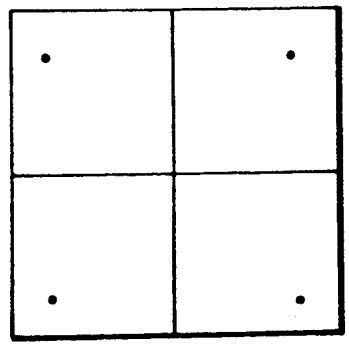
FIGS. 19(A), 19(B) and 19(C) are views illustrating the influence of the decentering distortion on the image.
Figure 19B:
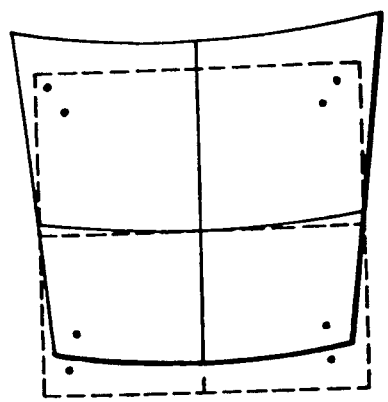
Figure 19C:
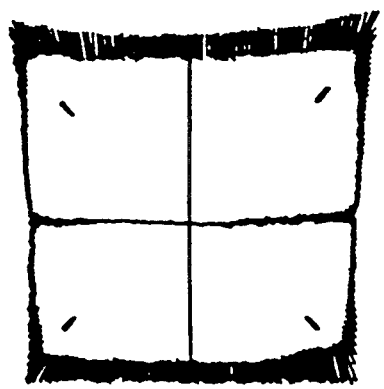

The image deflecting optical system of the structure having the variable vertical angle prism incorporated in the lens system has a merit that the diameter of the variable vertical angle prism can be minimized, and, therefore, the size of the deflecting optical system with inclusion of the associated mechanisms can be minimized. In addition to this, another merit is that the driving power for the variable vertical angle prism also can be minimized. The use of the principle of the invention in such an image deflecting optical system produces an advantage that the decentering distortion produced can be corrected to a minimum. Therefore, when the image blur compensation has been carried out, no such diffusion of the image in the marginal portion as shown in FIG. 19(C) does occur. Hence during compensating for the image blur, an image of high quality is obtained over the entire area of the image plane.

What is claimed is:

1. An optical device comprising, from front to rear:
   a first lens unit arranged to produce a prescribed aberration in an over-corrected manner;
   an optical unit having a variable vertical angle for deflecting an image; and
   a second lens unit arranged to produce said prescribed aberration in an under-corrected manner wherein the optical device satisfies the following conditions:

$$-0.012 < T_2 - (\delta NP)/(Np - 1) < 0.012$$

$$-1.3 < \frac{T_1}{T_2} < -0.7$$

wherein $T_1$ and $T_2$ are lateral chromatic aberration coefficients of said first lens unit and said second lens unit when the focal length of the entire system is normalized to unit, Np and Np' are respectively a refractive indice for a d-line wavelength and a refractive indice for a g-line wavelength of said optical unit, and "$\delta NP$" is defined as "$|Np-Np'|$".

2. A device according to claim 1, wherein said prescribed aberration is a lateral chromatic aberration.

3. A device according to claim 1, wherein said optical unit is a variable vertical angle prism.

4. A device according to claim 1 or 3, wherein the following conditions are satisfied:

$$|f_1| \leq 20f$$

$$0.985 < \frac{(\beta_2') \cdot (Np' - 1)}{(\beta_2) \cdot (Np - 1)} < 1.015$$

wherein f represents a focal length of a whole system, $f_1$ is a focal length of said first lens unit and $\beta_2$ and $\beta_2'$ are image magnifications for said d-line wavelength and said g-line wavelength of said second lens unit, respectively.

5. A device according to claim 1 or 3, wherein the following conditions are satisfied:

$$|f_1| > 20f$$

$$0.985 < \frac{(f_2') \cdot (Np' - 1)}{(f_2) \cdot (Np - 1)} < 1.015$$

wherein f represents a focal length of a whole system, $f_1$ represents the focal length of said first lens unit, and $f_2$ and $f_2'$ are focal lengths for said d-line wavelength and said g-line wavelength of said second lens unit, respectively.

6. A device according to claim 2, wherein said second lens unit has, from the front, a front lens sub-unit composed of a plurality of lenses, an air space that is the largest within said second lens unit, and a rear lens sub-unit composed of a plurality of lenses, and the following condition is satisfied:

$$V2B < 40$$

where V2B represents an equivalent Abbe number of said rear lens sub-unit.

7. An optical device comprising; in the direction of the advance of a light flux from an object to an image,
   a first lens unit having a negative chromatic aberration coefficient $T_1$.
   an optical unit for changing a refraction angle of said light flux coming out from said first lens unit,
   a second lens unit having a positive chromatic aberration coefficient, $T_2$,
   whereby an image is formed by said light flux coming out from said second lens unit, and the following condition is satisfied:

$$-0.012 < T_2 - (\delta NP)/(Np-1) < 0.012$$

wherein the refractive indexes of the d-line wavelength and g-line wavelength of said optical unit respectively are defined as Np and Np' and $\delta NP$ is defined as "$|Np-Np'|$".

8. A device according to claim 7, which satisfies the following condition:

$$-1.3 < T1/T2 < -0.7.$$

* * * * *

UNITED STATES PATENT AND TRADEMARK OFFICE
CERTIFICATE OF CORRECTION

PATENT NO. : 5,140,462

DATED : August 18, 1992

INVENTOR(S) : NOZOMU KITAGISHI

Page 1 of 3

It is certified that error appears in the above-identified patent and that said Letters Patent is hereby corrected as shown below:

<u>Abstract [56]</u>

Line AAF, insert --Attorney, Agent or Firm - Fitzpatrick, Cella, Harper & Scinto--.

<u>Column 1:</u>

Line 10, "system" should read --systems--.

<u>Column 2:</u>

Line 53, "$\Theta_1 = \sin^{31\ 1}(\sin\Theta/Np)$" should read --$\Theta_1 = \sin^{-1}(\sin\Theta/Np)$--.

Line 56, "$\Theta_2' = \sin^{31\ 1}(Np \cdot \sin\Theta_2)$" should read --$\Theta_2' = \sin^{-1}(Np \cdot \sin\Theta_2)$--.

Line 65, "prism. The" should read --prism. ¶ The--.

<u>Column 5:</u>

Line 66, "$(\Sigma_v^K +_T{}^1 - (h/h)_v \Sigma_v^K +_1 L) - N_v \cdot L_v/(h \cdot Q)_v$" should read --$(\Sigma_v^K + T_1 - (\overline{h}/h)_v \Sigma_v^K + L_1) - NV \cdot L_v/(h \cdot Q)_v$--.

<u>Column 6:</u>

Line 9, "by s" should read --by a--.

Line 27, "$(Np-1)(\overline{{}_{hp}L_2} - {}_{hp}T_2)(\delta Np) \approx 0$" should read --$(N_P-1)(\overline{h}_P L_2 - h_P T_2) + h_P(\delta Np) \approx 0$--.

UNITED STATES PATENT AND TRADEMARK OFFICE
CERTIFICATE OF CORRECTION

PATENT NO. : 5,140,462

DATED : August 18, 1992

INVENTOR(S) : NOZOMU KITAGISHI

It is certified that error appears in the above-identified patent and that said Letters Patent is hereby corrected as shown below:

Column 7:

Line 39, "vertical angle e," should read --vertical angle $\varepsilon$,--.

Line 62, "$\Delta(\Delta Y)_2 \propto - T_2 \tan(\Delta 107)$" should read --$\Delta(\Delta Y)_2 \propto - T_2 \tan(\Delta w)$--.

Column 11:

Line 47, "of-" should read --of--.

Column 12:

Line 2, "angle e" should read --angle $\varepsilon$--.

Column 13:

Line 16, "$f_{II-2}$" should read --$f_{II-2}.$--.

Column 21:

Line 28, "unit," should read --unity,--.

Line 29, "indice" should read --index--.

Line 30, "indice" should read --index--.

UNITED STATES PATENT AND TRADEMARK OFFICE
CERTIFICATE OF CORRECTION

PATENT NO. : 5,140,462

DATED : August 18, 1992

INVENTOR(S) : NOZOMU KITAGISHI

It is certified that error appears in the above-identified patent and that said Letters Patent is hereby corrected as shown below:

<u>Column 22</u>:

Line 25, "comprising;" should read --comprising:--.

Line 33, "coefficient, $T_2$," should read --coefficient $T_2$;--.

Signed and Sealed this

Twenty-eighth Day of December, 1993

Attest:

BRUCE LEHMAN

Attesting Officer     Commissioner of Patents and Trademarks